US012652705B2

(12) United States Patent
Shin et al.

(10) Patent No.: US 12,652,705 B2
(45) Date of Patent: Jun. 9, 2026

(54) RANDOM ACCESS METHOD AND APPARATUS IN WIRELESS COMMUNICATION SYSTEM

(71) Applicant: LG Electronics Inc., Seoul (KR)

(72) Inventors: Seokmin Shin, Seoul (KR); Suckchel Yang, Seoul (KR); Seonwook Kim, Seoul (KR); Sechang Myung, Seoul (KR)

(73) Assignee: LG Electronics Inc., Seoul (KR)

( * ) Notice: Subject to any disclaimer, the term of this patent is extended or adjusted under 35 U.S.C. 154(b) by 243 days.

(21) Appl. No.: 18/681,464

(22) PCT Filed: Aug. 3, 2022

(86) PCT No.: PCT/KR2022/011444
§ 371 (c)(1),
(2) Date: Feb. 5, 2024

(87) PCT Pub. No.: WO2023/014069
PCT Pub. Date: Feb. 9, 2023

(65) Prior Publication Data
US 2024/0340967 A1      Oct. 10, 2024

(30) Foreign Application Priority Data
Aug. 5, 2021      (KR) ........................ 10-2021-0103118

(51) Int. Cl.
*H04W 72/04*        (2023.01)
*H04L 27/26*        (2006.01)
(Continued)

(52) U.S. Cl.
CPC ... *H04W 74/0833* (2013.01); *H04L 27/26025* (2021.01); *H04W 72/0446* (2013.01); *H04W 72/231* (2023.01)

(58) Field of Classification Search
None
See application file for complete search history.

(56) References Cited

U.S. PATENT DOCUMENTS

2017/0238345 A1      8/2017 Liu et al.
2023/0362983 A1* 11/2023 Yan ................... H04W 74/0891

FOREIGN PATENT DOCUMENTS

CN           114557085 A  *  5/2022   ........ H04W 74/0833
KR    10-2019-0086337 A      7/2019
(Continued)

OTHER PUBLICATIONS

International Search Report and Written Opinion in International Appln. No. PCT/KR2022/011444, mailed on Nov. 17, 2022, 8 pages (with English translation).
(Continued)

*Primary Examiner* — Kodzovi Acolatse
(74) *Attorney, Agent, or Firm* — Fish & Richardson P.C.

(57) ABSTRACT

Disclosed are a method and apparatus for performing random access in a wireless communication system. A method by which a terminal performs a random access procedure in a wireless communication system, according to an embodiment of the present disclosure, comprises the steps of: transmitting a random access preamble to a network from a slot based on a subcarrier spacing (SCS) exceeding a predetermined threshold value; monitoring downlink control information (DCI) based on a specific radio network temporary identifier (RNTI) corresponding to the random access preamble; and receiving a downlink data channel from the network, on the basis of scheduling information included in the DCI, wherein the specific RNTI is determined on the basis of a value derived via a modulo operation using 2M–K as a divisor, M is associated with an offset value for
(Continued)

Receive random access preamble
in slot based on
SCS exceeding predetermined threshold      S1010

Transmit DCI based on specific RNTI
corresponding to random access preamble and
downlink data channel based on
scheduling information included in DCI      S1020 distinguishing the type of the random access procedure, and K may be an integer exceeding 12.

12 Claims, 10 Drawing Sheets

(51) Int. Cl.
  *H04W 72/0446* (2023.01)
  *H04W 72/231* (2023.01)
  *H04W 74/0833* (2024.01)

(56) References Cited

FOREIGN PATENT DOCUMENTS

| | | | | |
|---|---|---|---|---|
| KR | 2019-0107035 | 9/2019 | | |
| KR | 2021-0008863 | 1/2021 | | |
| WO | WO 2019/139442 | 7/2019 | | |
| WO | WO-2022031743 A1 * | 2/2022 | ........ | H04W 74/0833 |
| WO | WO-2022201106 A1 * | 9/2022 | ........... | H04L 1/1819 |

OTHER PUBLICATIONS

Spreadtrum Communications, "Remaining issues on channel structure for 2-step RACH," R1-2006284, 3GPP TSG RAN WG1#102, E-Meeting, Aug. 17-28, 2020, 4 pages.
Notice of Allowance in Korean Appln. No. 10-2024-7002005, mailed on Feb. 23, 2026, 10 pages (with English translation).

* cited by examiner

FIG. 6

RANDOM ACCESS METHOD AND APPARATUS IN WIRELESS COMMUNICATION SYSTEM

CROSS-REFERENCE TO RELATED APPLICATIONS

This application is a National Stage application under 35 U.S.C. § 371 of International Application No. PCT/KR2022/011444, filed on Aug. 3, 2022, which claims the benefit of Korean Application No. 10-2021-0103118, filed on Aug. 5, 2021. The disclosures of the prior applications are incorporated by reference in their entirety.

TECHNICAL FIELD

The present disclosure relates to a wireless communication system, and in more detail, relates to a method and a device for performing random access in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical problem of the present disclosure is to provide a method and a device for performing or supporting random access in a wireless communication system.

An additional technical problem of the present disclosure is to provide a method and a device for supporting a random access preamble supporting subcarrier spacing increased in a wireless communication system and identification information based thereon.

An additional technical problem of the present disclosure is to provide a method and a device for distinguishing a type of a random access procedure in a wireless communication system.

The technical objects to be achieved by the present disclosure are not limited to the above-described technical objects, and other technical objects which are not described herein will be clearly understood by those skilled in the pertinent art from the following description.

A method for performing a random access procedure by a terminal in a wireless communication system according to an aspect of the present disclosure includes transmitting a random access preamble to a network in a slot based on subcarrier spacing (SCS) exceeding a predetermined threshold; monitoring downlink control information (DCI) based on a specific radio network temporary identifier (RNTI) corresponding to the random access preamble; and receiving a downlink data channel from the network based on scheduling information included in the DCI, and the specific RNTI is determined based on a value derived by a modulo operation using $2^M$–K as a divisor, M is associated with an offset value for distinguishing a type of a random access procedure and K may be an integer exceeding 12.

A method for responding to a random access procedure of a terminal by a base station in a wireless communication system according to an additional aspect of the present disclosure includes receiving a random access preamble from the terminal in a slot based on subcarrier spacing (SCS) exceeding a predetermined threshold; and transmitting to the terminal downlink control information (DCI) based on a specific radio network temporary identifier (RNTI) corresponding to the random access preamble and a downlink data channel based on scheduling information included in the DCI, and the specific RNTI is determined based on a value derived by a modulo operation using $2^M$–K as a divisor, M is associated with an offset value for distinguishing a type of a random access procedure and K may be an integer exceeding 12.

According to the present disclosure, a method and a device for performing or supporting random access in a wireless communication system may be provided.

According to the present disclosure, a method and a device for supporting a random access preamble supporting subcarrier spacing increased in a wireless communication system and identification information based thereon may be provided.

According to the present disclosure, a method and a device for distinguishing a type of a random access procedure in a wireless communication system may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

DETAILED DESCRIPTION

Figure 1:
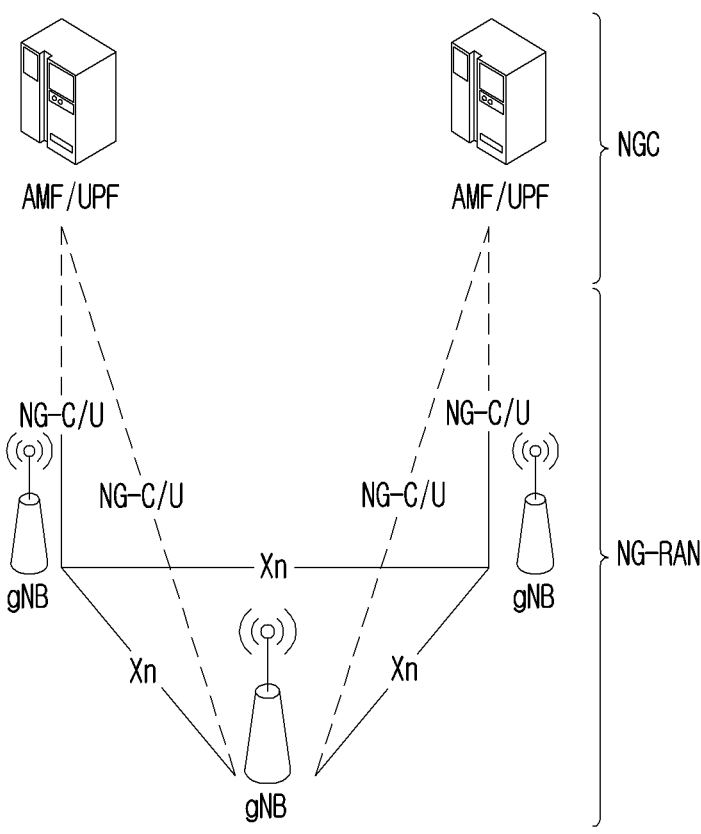
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
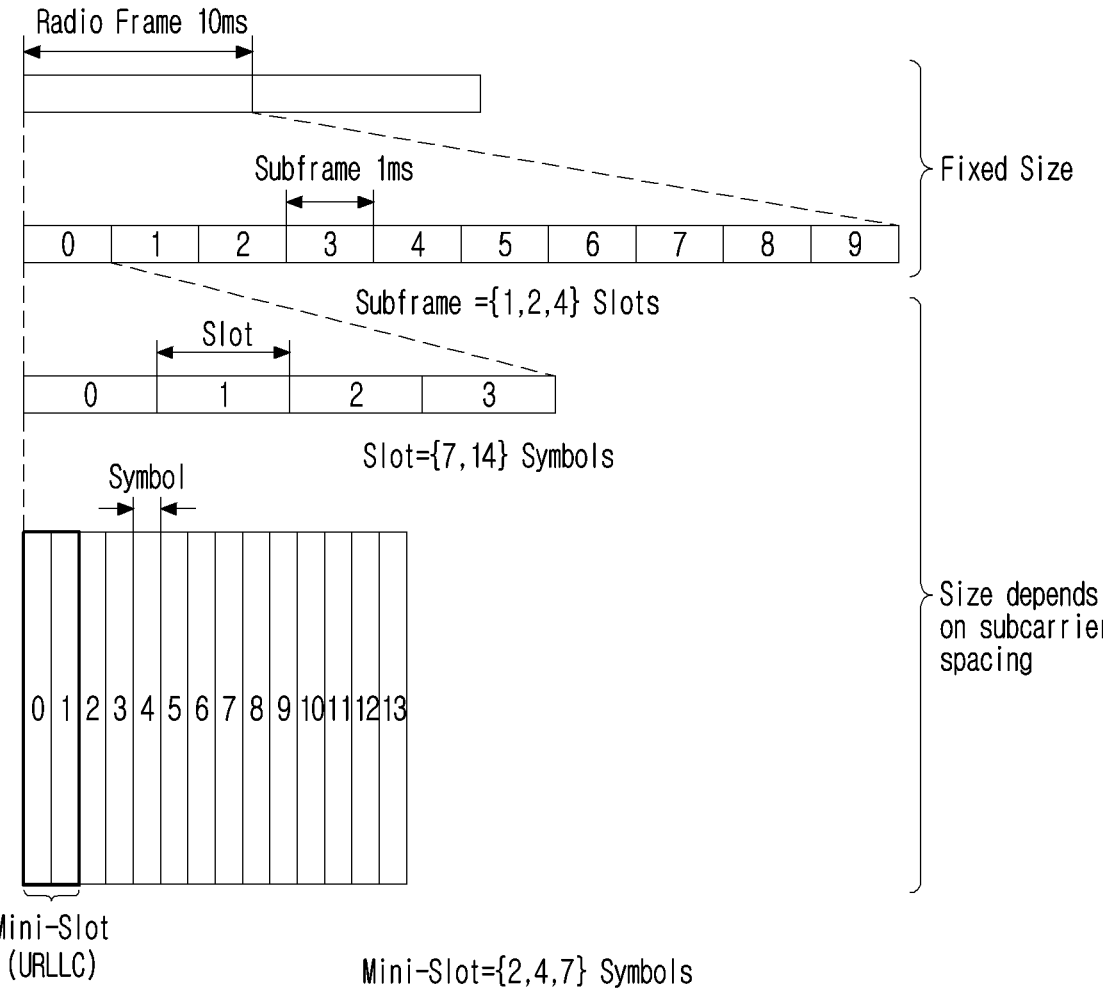
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, $\mu$). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^{\mu} \cdot 15$ [kHz] | CP |
| --- | --- | --- |
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration $\mu$, slots are numbered in an increasing order of $n_s^{\mu} \in \{0, \ldots, N_{slot}^{subframe,\mu}-1\}$ in a subframe and are numbered in an increasing order of $n_{s,f}^{\mu} \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu}N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$) the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

Figure 3:
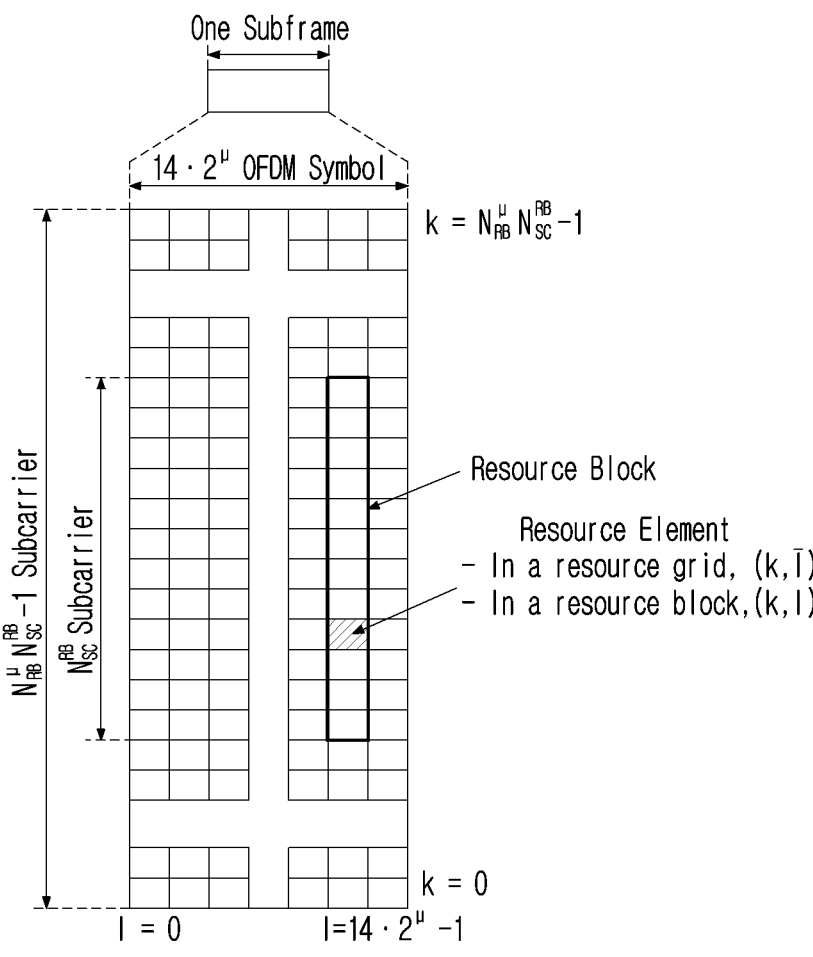
FIG. 3 illustrates a resource grid in a wireless communication system to which the present disclosure may be applied.

FIG. 2 is an example on $\mu=2$ (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing. FIG. 3 illustrates a resource grid in a wireless communication system to which the present disclosure may be applied. In reference to FIG. 3, it is illustratively described that a resource grid is configured with $N_{RB}^{\mu}N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu}N_{symb}^{(\mu)}$ and one or more resource grids configured with $N_{RB}^{\mu}N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per $\mu$ and antenna port p. Each element of a resource grid for and an antenna port p is referred to as a resource element and is uniquely identified by an index pair $(k,l')$. Here, $k=0, \ldots, N_{RB}^{\mu}N_{sc}^{RB}-1$ is an index in a frequency domain and $l'=0, \ldots, 2^{\mu}N_{symb}^{(\mu)}-1$ refers to a position of a symbol in a subframe. When referring to a resource element in a slot, an index pair $(k,l)$ is used. Here, $l=0, \ldots, N_{symb}^{\mu}-1$. A resource element $(k,l')$ for and an antenna port p corresponds to a complex value, $a_{k,l'}^{(p,\mu)}$. When there is no risk of confusion or when a specific antenna port or numerology is not specified, indexes p and $\mu$ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration $\mu$. The center of subcarrier 0 of common resource block 0 for a subcarrier spacing configuration $\mu$ is identical to 'point A'. A relationship between a common resource block number $n_{CRB}^{\mu}$ and a resource element $(k,l)$ for a subcarrier spacing configuration $\mu$ in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \qquad \text{[Equation 2]}$$

$N_{BWP,i}^{start,\mu}$ is a common resource block that a BWP starts relatively to common resource block 0.

Figure 4:
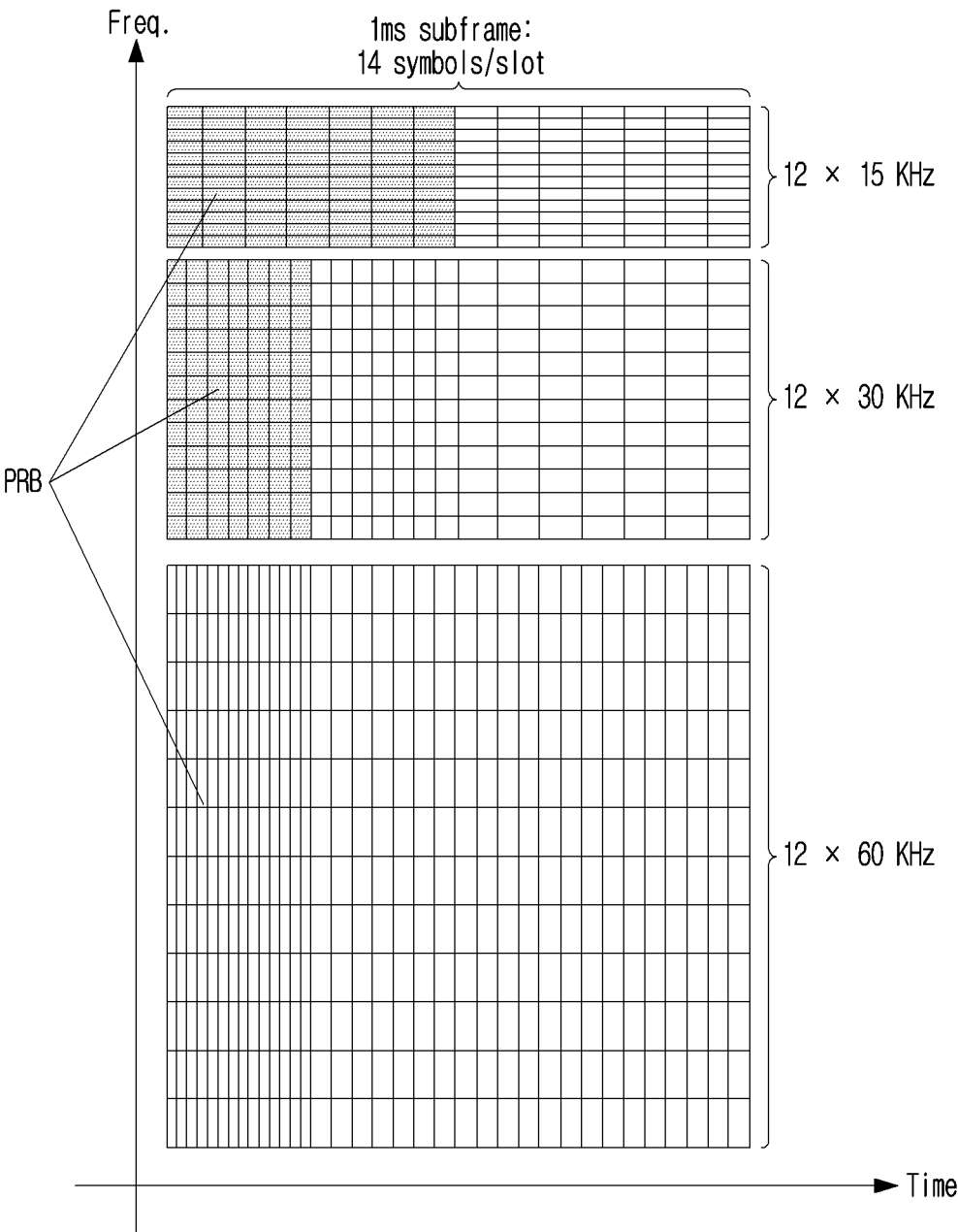
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
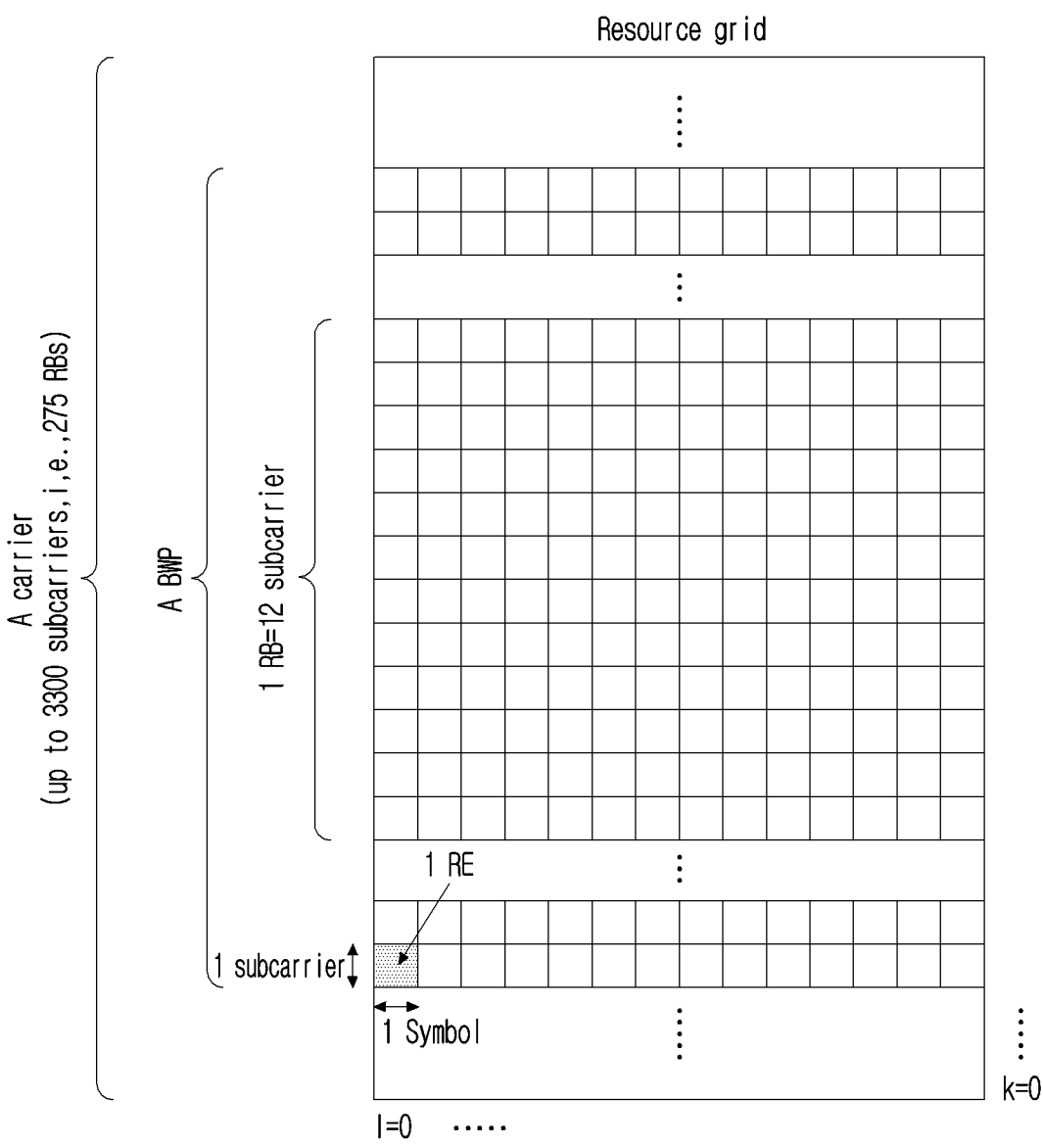
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
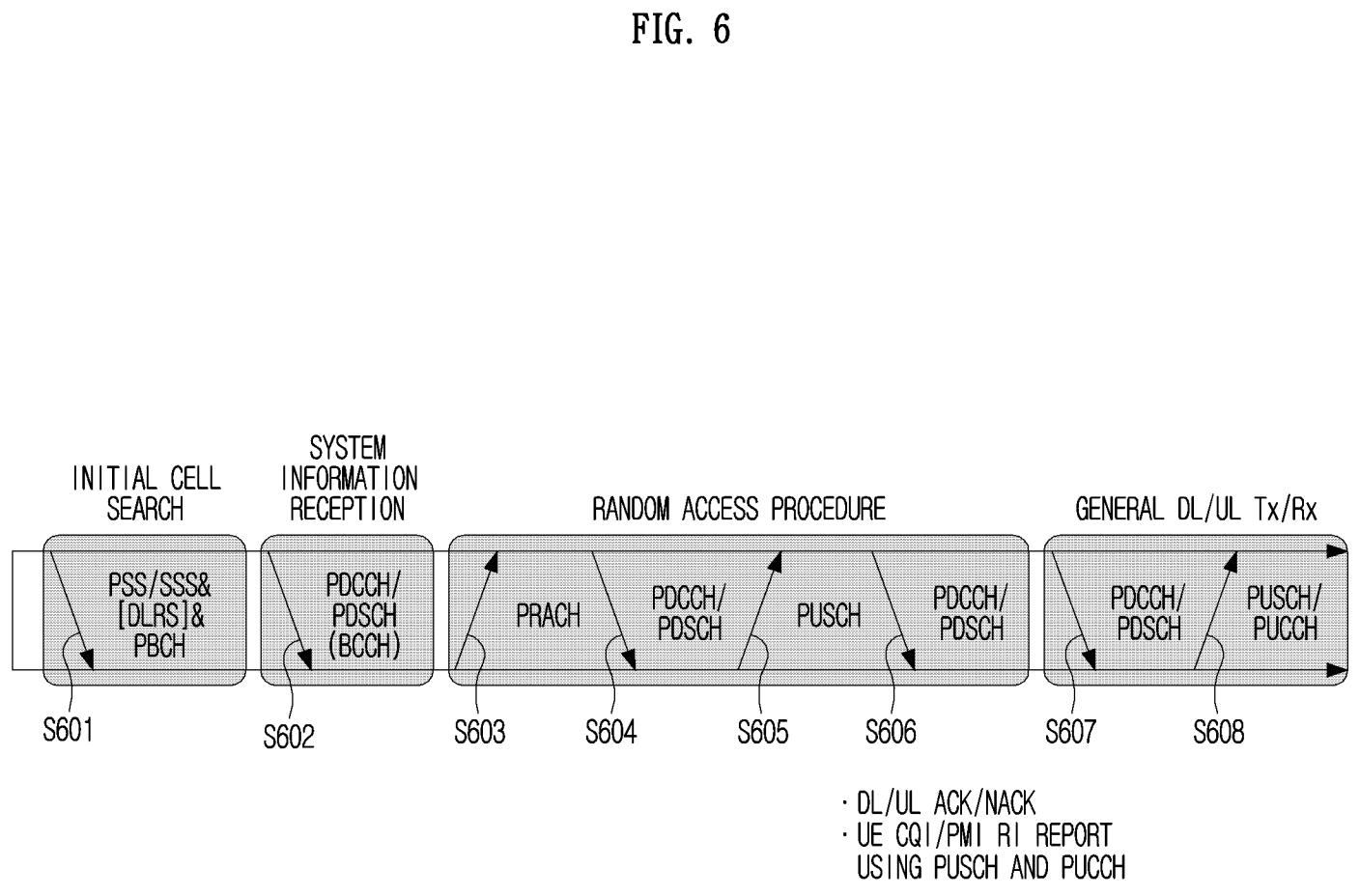

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 an 0_2 may include resource information (e.g., UL/SUL (Supplementary UL), frequency resource allocation, time resource allocation, frequency hopping, etc.), information related to a transport block (TB) (e.g., MCS (Modulation and Coding Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted. DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted. DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Random Access Procedure

A random access process may be used for a variety of purposes and in a variety of situations. For example, a random access process may be used in network initial access, handover or an UE-triggered uplink data transmission procedure, etc. A terminal may acquire uplink synchronization and uplink transmission resources through a random access process. A random access process is divided into a contention-based process and a non-contention-based process (or dedicated process). Here, in describing the present disclosure, a random access process may be used interchangeably with a random access channel (RACH) procedure.

Figure 7:
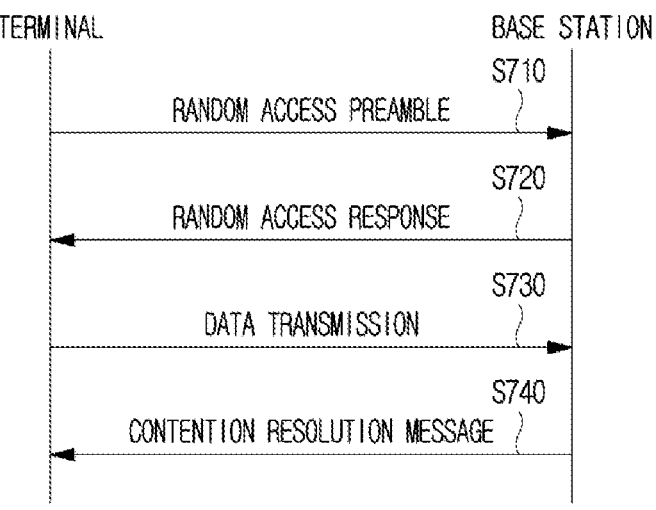
FIG. 7 shows an example of a contention-based random access process in a wireless system to which the present disclosure may be applied.

FIG. 7 shows an example of a contention-based random access process in a wireless system to which the present disclosure may be applied.

In reference to FIG. 7, a terminal may receive information on random access from a base station through system information (e.g., a master information block (MIB) or system information block 1 (SIB1), etc.). Afterwards, when random access is required, a terminal may transmit a random access (or random access) preamble (i.e., message 1 (msg1)) to a base station S710. For example, a terminal may transmit a random access preamble to a base station through a physical random access channel (PRACH).

Here, a terminal may select an optimal SSB or Channel Status Information-Reference Signal (CSI-RS) and determine a RO and/or a preamble index group associated with a selected SSB or CSI-RS. In an initial access process, a terminal may select an optimal SSB and a reception beam corresponding thereto among a plurality of SSBs corresponding to multi-beam sweeping of a base station. Meanwhile, in a RRC connection state after initial access, a terminal may select or change a transmission beam and/or a reception beam through a CSI measurement and reporting process based on a CSI-RS from a base station.

When a random access preamble is received from a terminal, a base station may transmit a random access (or random access) response (RAR) message (i.e., message 2 (msg2)) to a terminal S720. In other words a terminal may monitor RAR reception for a predetermined time period (e.g., a RAR window) after transmitting a preamble.

Specifically, scheduling information on a random access response message may be CRC-masked (or scrambled) with a random access-radio network temporary identifier (RA-RNTI) and transmitted on a L1/L2 control channel (e.g., a L1 control channel may include a PDCCH, etc. and a L2 control channel may include a common control channel (CCCH), etc.). A PDCCH masked with a RA-RNTI may be transmitted only through a common search space.

When receiving a scheduling signal masked with a RA-RNTI, a terminal may receive a random access response message from a PDSCH indicated by the scheduling information. Afterwards, a terminal may check whether a random access response message includes random access response information indicated to a terminal itself. A process of checking whether random access response information indicated to a terminal itself exists may include a process of checking whether a random access preamble ID (RAPID) corresponding to a random access preamble transmitted by a terminal is present in a random access response message. Random access response information may include timing offset information for UL synchronization (e.g., a timing advance command, TAC), uplink scheduling information (e.g., uplink grant) and terminal temporary identification information (e.g., a temporary cell-RNTI, a Temporary C-RNTI), etc.

When a terminal does not successfully receive RAR during a RAR window, it may retransmit a preamble by applying power ramping, etc.

When receiving random access response information, a terminal may transmit uplink-shared channel (UL-SCH) data (i.e., message (msg) 3) to a base station through a PUSCH based on uplink scheduling information S730. After receiving UL-SCH data, a base station may transmit a contention resolution message (i.e., message (msg) 4) to a terminal S740. For example, when Msg3 transmission is performed, a terminal may start a contention resolution timer (a CR timer) and perform PDCCH monitoring based on a C-RNTI for Msg4 reception. When Msg4 is received while a CR timer is running, a terminal may determine that contention resolution was successfully implemented.

A random access process like an example in FIG. 7 may be referred to as a type-1 (or 4-step) random access process. Type-2 (or 2-step) random access may include Step A (or MsgA transmission) in which a terminal transmits a random access preamble (or a PRACH) and an uplink message (e.g., a PUSCH) to a base station and Step B (or MsgB reception) in which a terminal receives a random access response, a contention resolution message, etc. from a base station. Here, a terminal may monitor a PDCCH or DCI CRC-scrambled by a corresponding MsgB-RNTI during a MsgB window after MsgA transmission.

Figure 8:
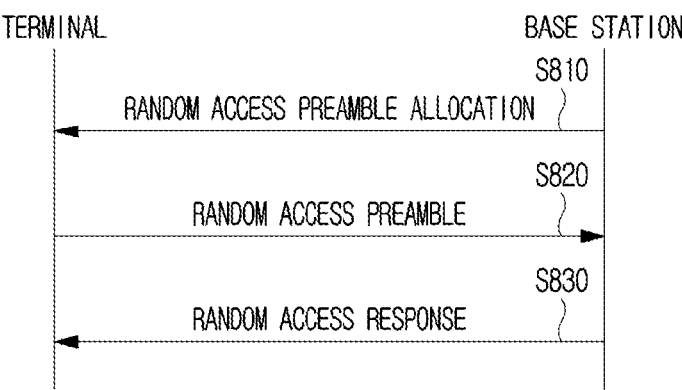
FIG. 8 shows an example of a non-contention-based random access process in a wireless system to which the present disclosure may be applied.

FIG. 8 shows an example of a non-contention-based random access process in a wireless system to which the present disclosure may be applied.

A non-contention-based random access process may be used in a handover process or may be performed when separately requested by a command from a base station. A basic procedure of a non-contention-based random access procedure is the same as a contention-based random access procedure.

In reference to FIG. 8, a terminal may be allocated a dedicated random access (or random access) preamble from a base station S810. Information indicating a dedicated random access preamble (e.g., a preamble index) may be included in a RRC message (e.g., a handover command) or may be received through a PDCCH order.

After initiating a random access procedure, a terminal may transmit a dedicated random access (or random access) preamble to a base station S820. Afterwards, a random access procedure may be ended when a terminal receives a random access (or random access) response from a base station S830. A random access procedure on a secondary cell (SCell) may be initiated only by a PDCCH order.

Enhanced Random Access Preamble Identifier

Various examples related to a random access operation of the present disclosure may be also applied to uplink transmission in a licensed band (e.g., a L-cell) or an unlicensed band (e.g., an U-cell or a shared spectrum) and examples of the present disclosure may be modified or replaced to fit a term, an expression, a structure, etc. defined in each system so that they can be implemented in a corresponding system.

An unlicensed band may include a 2.4 GHz frequency band mainly used by an existing WLAN system and a recently discussed frequency band such as 5 GHz, 6 GHz, 60 GHz, etc. and the application of the present disclosure is not limited thereto. Basically, an unlicensed band assumes a method of wireless transmission or reception through contention between each communication node, so each communication node is required to confirm that another communication node does not perform signal transmission by performing channel sensing before transmitting a signal. For convenience, this operation is referred to as listen before talk (LBT) or a channel access procedure (CAP). In particular, an operation of checking whether another communication node transmits a signal is defined as carrier sensing (CS) and a case where it is determined that another communication node does not transmit a signal is defined as clear channel assessment (CCA). UE or eNB (or gNB or a base station) of a LTE/NR system should also perform LBT to transmit a signal in an unlicensed band (referred to as an U-band for convenience, but it may be also referred to as a shared spectrum), and when eNB or UE of a LTE/NR system transmits a signal, other communication nodes such as WiFi, etc. should also perform LBT to avoid causing interference. For example, in a WiFi standard, a CCA threshold is stipulated as −62 dBm for a non-WiFi signal and −82 dBm for a WiFi signal, which means that a STA or an AP, for example, does not transmit a signal to avoid causing interference when a signal other than WiFi is received with power of −62 dBm or higher.

As described above, a NR system supports multiple numerologies (e.g., subcarrier spacing (SCS)). For example, when SCS is 15 kHz, it supports a wide area in traditional cellular bands, and when SCS is 30 kHz/60 kHz, it supports a dense-urban, lower latency and wider carrier bandwidth, and when SCS is 60 kHz or higher, it supports a bandwidth greater than 24.25 GHz to overcome phase noise.

A band higher than a frequency band (FR1, FR2) in Table 2 described above (e.g., a 52.6 GHz to 114.25 GHz band, in particular, 71 GHz) may be referred to as a new frequency range (e.g., FR3, FR4) and a corresponding frequency range may be also used as an unlicensed band (or a shared spectrum).

A random access preamble identifier (a RA preamble ID) applied for an existing FR1/FR2 area may correspond to a RA-RNTI or a MSGB-RNTI, and an equation for deriving it is defined as follows.

A RA-RNTI associated with a PRACH occasion where a RA preamble is transmitted may be calculated as follows.

$$RA\text{-}RNTI = 1 + s\_id + 14 \times t\_id + 14 \times 80 \times f\_id + 14 \times 80 \times 8 \times ul\_carrier\_id$$

A MSGB-RNTI associated with a PRACH occasion where a RA preamble is transmitted may be calculated as follows.

$$MSGB\text{-}RNTI = 1 + s\_id + 14 \times t\_id + 14 \times 80 \times f\_id + 14 \times 80 \times 8 \times ul\_carrier\_id + 14 \times 80 \times 8 \times 2$$

Here, s_id is an index of a first OFDM symbol of a PRACH occasion ($0 \leq s\_id < 14$). t_id is an index of a first slot of a PRACH occasion in a system frame ($0 \leq t\_id < 80$) and subcarrier spacing for determining t_id may be based on a value of in Table 3, etc. f_id is an index of a PRACH occasion (or a RO) in a frequency domain ($0 \leq f\_id < 8$). ul_carrier_id is an identification value of an UL carrier used for RA preamble transmission (0 for a normal uplink (NUL), 1 for a supplementary uplink (SUL)).

An existing RA-RNTI/MSG-RNTI calculation equation is defined by assuming SCS of up to 120 kHz. As described above, a RA-RNTI/a MSG-RNTI is associated with a RACH occasion (RO) (or a PRACH occasion) where a RA preamble is transmitted and a change in SCS is associated with a change in a unit time length of a RO. For example, a case in which SCS higher than 120 kHz (e.g., 480 kHz, 960 kHz, etc.) is used is also discussed. This high SCS is being discussed for use in a new frequency range (e.g., exceeding 52.6 GHz), but high SCS may be also supported for other purposes. High SCS means a short time unit length (e.g., an OFDM symbol length, a slot length, etc.), so definition of a new RA-RNTI/MSGB-RNTI for supporting an increase in RACH slot density and/or an increased in PRACH occasion (RO) density is required.

A method of deriving a random access preamble identifier (e.g., a RA-RNTI/a MSG-RNTI) which is being discussed in this regard may also include a method of applying a modulo operation to the entire existing RA-RNTI/MSGB-RNTI equation.

For example, according to RA-RNTI=$(1+s\_id+14 \times t\_id+14 \times max(80, N_{slot}^{frame,\mu}) \times f\_id+14 \times max(80, N_{slot}^{frame,\mu}) \times 8 \times ul\_carrier\_id) mod \ 2^{16}$, a RA-RNTI may be derived. Hereinafter, it is referred to as "Option 1" in a RA-RNTI equation.

As an additional example, a PRACH may be divided into N segments and a RA-indication field may be added to DCI. For example, according to RA-RNTI=$(1+s\_id+14 \times t\_id+14 \times (80 \times 2^{\mu-3}) \times f\_id+14 \times (80 \times 2^{\mu-3}) \times 8 \times ul\_carrier\_id) \ mod \ 2^{15}$, a RA-RNTI may be derived. Hereinafter, it is referred to as "Option 2" in a RA-RNTI equation.

Regarding Option 2, a RA-indication field of floor$\{(1+s\_id+14 \times t\_id+14 \times (80 \times 2^{\mu-3}) \times f\_id+14 \times (80 \times 2^{\mu-3}) \times 8 \times ul\_carrier\_id)/2^{15}\}$ may be defined in DCI and a RA-RNTI value may be indicated through a RA-indication field. Here, a floor$\{X\}$ operation (or a floor operation) means the maximum integer value less than or equal to X. In addition, in the equations, $2^{\mu-3}$ may correspond to considering a value of increasing $\mu$ (e.g., $\mu=5$ and 6 for SCS=480 and 960 kHz, respectively) by using a case of $\mu=3$ (i.e., SCS=120 kHz) as a reference.

As such, in a method of applying a modulo operation to the entire existing RA-RNTI equation to derive a RA-RNTI value in an increased range, there is a problem that a value of already defined RNTIs (e.g., C-RNTIs) is derived as a value of a RA-RNTI. Accordingly, a new method of deriving a RA-RNTI value excluding a predefined RNTI value even while deriving a RA-RNTI value in an increased range is required.

In addition, according to the modification of a RA-RNTI equation, an equation for deriving a MSGB-RNTI also needs to be modified. In this regard, a new method of distinguishing between type 1 or 2 (or 4-step or 2-step) random access is also described in the present disclosure.

Figure 9:
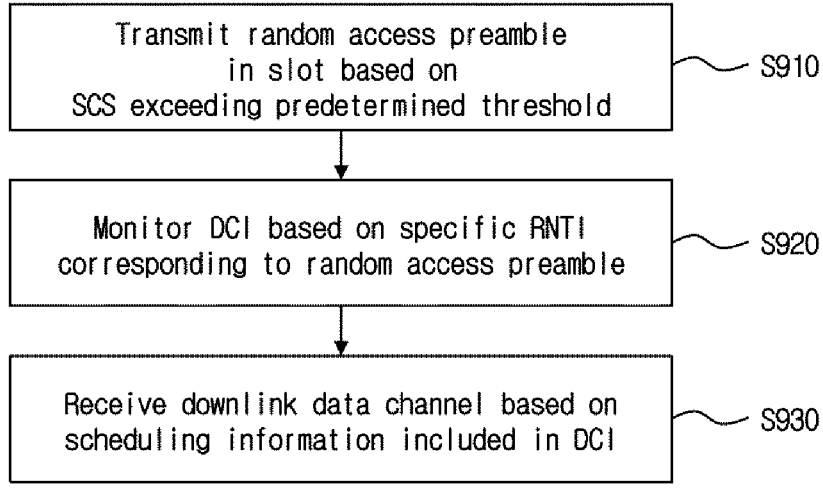
FIG. 9 is a diagram for describing a method of performing random access of a terminal according to an embodiment of the present disclosure.

FIG. 9 is a diagram for describing a method of performing random access of a terminal according to an embodiment of the present disclosure.

In S910, a terminal may transmit a random access preamble to a network in a slot based on subcarrier spacing (SCS) exceeding a predetermined threshold.

For example, a predetermined threshold may be 120 kHz and SCS may be 480 kHz, 960 kHz, etc.

In S920, a terminal may monitor downlink control information (DCI) based on a specific RNTI corresponding to a random access preamble.

DCI monitoring may include attempting to detect a DCI format CRC-scrambled with a specific RNTI. DCI may be received through a PDCCH.

A specific RNTI may be determined based on a value derived by a modulo operation using $2^M$ or $2^M$–K2M as a divisor. M may be associated with an offset value to distinguish a type of a random access procedure. For example, M may have a value of 16, 15, 14, . . . . When K is applied, K may be configured/defined as a value which ensure that a candidate value of a specific RNTI does not overlap with a candidate value of another predefined/reserved RNTI. For example, K may have a value of 12, 13, 14, . . . .

A specific RNTI may be a RA-RNTI related to a type-1 (or 4-step) random access procedure or may be a MSGB-RNTI related to a type-2 (or 2-step) random access procedure. A range of a candidate value of a RA-RNTI and a range of a candidate value of a MSGB-RNTI may not overlap. In this case, it may be possible to distinguish between a RA-RNTI/a MSGB-RNTI or distinguish between type-1/type-2 only with a RNTI value. When DCI includes a random access indication (RA-indication) field, a specific RNTI value may be determined based on a value derived by a RA-RNTI/MSGB-RNTI equation and a value of a RA-indication field. A value of a RA-indication field may be determined based on a floor operation using $2^M$–K as a denominator. Alternatively, based on a RNTI value and additionally, additional information in DCI, it may be possible to distinguish between a RA-RNTI/a MSGB-RNTI or distinguish between Type-1/Type-2.

In S930, a terminal may receive a downlink data channel based on scheduling information included in DCI.

A downlink data channel may include random access response (RAR) information. A terminal may perform a subsequent step of a random access procedure (e.g., Msg3 transmission or contention resolution message reception) based on a RAR.

Figure 10:
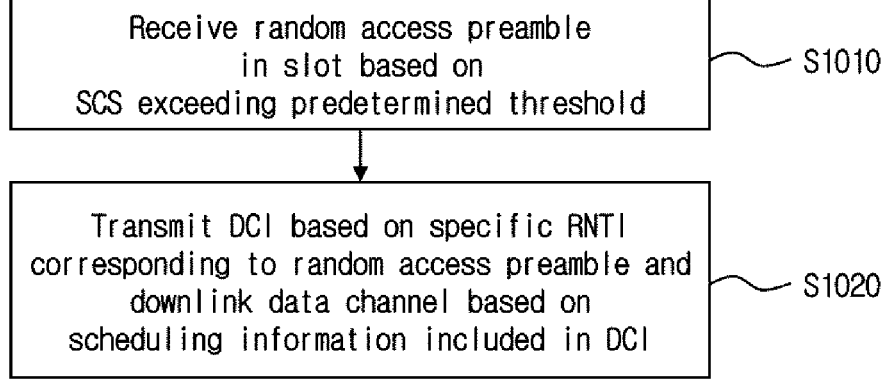
FIG. 10 is a diagram for describing a random access response method of a base station according to an embodiment of the present disclosure.

FIG. 10 is a diagram for describing a random access response method of a base station according to an embodiment of the present disclosure.

In S1010, a base station may receive a random access preamble from a terminal in a slot based on subcarrier spacing (SCS) exceeding a predetermined threshold.

In S1020, a base station may transmit to a terminal downlink control information (DCI) based on a specific RNTI corresponding to a random access preamble and a downlink data channel based on scheduling information included in the DCI.

In S1020, a base station may transmit to a terminal downlink control information (DCI) based on a specific RNTI corresponding to a random access preamble and a downlink data channel based on scheduling information included in the DCI.

Hereinafter, specific examples of the present disclosure are described.

Embodiment 1

This embodiment is about what should be considered when a modulo operation is applied to the entire RA-RNTI equation.

When a RA-RNTI and/or MSGB-RNTI equation is modified as high SCS (e.g., 480 kHz, 960 kHz) is introduced, the following matters may be considered in applying a modulo operation.

Embodiment 1-1

For example, a divisor of a modulo operation may be defined as power of two (e.g., $2^M$). Since the number of bits delivering an existing RNTI is 16 bits and a RNTI value may not have 0, the maximum value that a RNTI value may have may be $2^{16}-1$. Accordingly, in power of 2, M may be an integer less than or equal to 16 (e.g., M=16, 15, 14, . . . ).

For example, a divisor of a modulo operation may be defined as a value obtained by subtracting or adding a value of K from or to power of 2 (e.g., $2^M$–K or $2^M$+K). K may be defined/configured as a value to prevent a predefined RNTI (e.g., a SI-RNTI, a P-RNTI, a reserved RNTI, etc.) value from being derived as a RA-RNTI value.

For example, a RNTI value may be defined as in Table 6.

TABLE 6

| Value (hexa-decimal) | RNTI |
|---|---|
| 0000 | N/A |
| 0001-FFF2 | RA-RNTI, MSGB-RNTI, Temporary C-RNTI, C-RNTI, CI-RNTI, MCS-C-RNTI, CS-RNTI, TPC-PUCCH-RNTI, TPC-PUSCH-RNTI, TPC-SRS-RNTI, INT-RNTI, SFI-RNTI, SP-CSI-RNTI, PS-RNTI, SL-RNTI, SLCS-RNTI SL Semi-Persistent Scheduling V-RNTI, and AI-RNTI |
| FFF3-FFFD | Reserved |
| FFFE | P-RNTI |
| FFFF | SI-RNTI |

In reference to Table 6, a RA-RNTI value should avoid a total of 13 predefined RNTI values. In other words, for FFF3-FFFD corresponding to a Reserved state (65523-65533 in decimal), FFFE corresponding to a P-RNTI (65534 in decimal) and FFFF corresponding to a SI-RNTI (65535 in decimal), 13 values correspond to a value that a RA-RNTI may not have. For example, a divisor of a modulo operation for a RA-RNTI value may be defined in a form of $2^M$-K. Here, since 13 predefined RNTIs should be avoided, K may be defined as an integer equal to or greater than 13 (e.g., K=13, 14, 15, . . . ).

Additionally or alternatively, considering that 0 is not used as a RNTI value, a value equal to or greater than 1 is used as a value of all RNTIs and the minimum value of a result of all modulo operations is 0, an equation for deriving a RA-RNTI/a MSG-RNTI may be defined. For example, a RA-RNTI/MSGB-RNTI equation may be also defined by adding 1 to a result of a modulo operation for deriving a RA-RNTI/a MSG-RNTI (e.g., applying $2^M$, $2^M$–K or $2^M$+K as a divisor of a modulo operation). For example, +1 may be applied to the first or the last of a RA-RNTI/MSGB-RNTI equation (i.e., to a result of a modulo operation).

Embodiment 1-2

Examples of applying matters described in Embodiment 1-1 to the above-described Option 1 or Option 2 are described below.

In Option 1, +1 may be changed to be applied to a result of a modulo operation, not to be included in a dividend of a modulo operation (i.e., taking +1 out of a parentheses of a mod operation). In other words, an equation in Option 1 may be changed into RA-RNTI=1+(s_id+14×t_id+14×max(80, $N_{slot}^{frame,\mu}$)×f_id+14×max(80, $N_{slot}^{frame,\mu}$)×8×ul_carrier_id) mod $2^{16}$. In addition, a value of k may be subtracted from a divisor of a modulo operation to avoid having a predefined/reserved RNTI value. In other words, the equation may be changed into RA-RNTI=1+(s_id+14×t_id+14×max(80, $N_{slot}^{frame,\mu}$)×f_id+14×max(80, $N_{slot}^{frame,\mu}$)×8×ul_carrier_id) mod ($2^{16}$–K).

In the above-described Option 1, a RA-indication field in DCI is not defined, but in Option 1 modified according to the present disclosure, a RA-RNTI/MSGB-RNTI value may be indicated through a RA-indication field in DCI. As a result of calculating the changed RA-RNTI/MSGB-RNTI equation, the same RA-RNTI/MSGB-RNTI value may be derived even for a different RO time position/RO frequency position/SCS/number of slots per frame/carrier identifier, so RA-indication information in DCI may be utilized to distinguish the same RNTI value. RA-indication may be also applied to a RA-RNTI and/or a MSGB-RNTI. In addition, a RA-indication field may be included in DCI where a base station schedules a RAR (e.g., DCI format 1_0 CRC-scrambled by a RA-RNTI (or a MSGB-RNTI)) to configure/indicate corresponding information to a terminal.

For example, with regard to Option 1, it may be defined as RA-indication=floor{(1+s_id+14×t_id+14×max(80, $N_{slot}^{frame,\mu}$)×f_id+14×max(80, $N_{slot}^{frame,\mu}$)×8×ul_carrier_id)/($2^{16}$+1)}. Additionally, in order to avoid having a predefined/reserved RNTI value, it may be defined as RA-indication=floor{(1+s_id+14×t_id+14×max(80, $N_{slot}^{frame,\mu}$)×f_id+14×max(80, $N_{slot}^{frame,\mu}$)×8×ul_carrier_id)/($2^{16}$–K+1)}.

Additionally or alternatively, with regard to Option 1, it may be defined as RA-indication=floor{(s_id+14×t_id+14×max(80, $N_{slot}^{frame,\mu}$)×f_id+14×max(80, $N_{slot}^{frame,\mu}$)×8×ul_carrier_id)/$2^{16}$}. Additionally, in order to avoid having a predefined/reserved RNTI value, it may be defined as RA-indication=floor{(s_id+14×t_id+14×max(80, $N_{slot}^{frame,\mu}$)×f_id+14×max(80, $N_{slot}^{frame,\mu}$)×8×ul_carrier_id)/($2^{16}$–K)}.

Next, In Option 2, +1 may be changed to be applied to a result of a modulo operation, not to be included in a dividend of a modulo operation (i.e., taking +1 out of a parentheses of a mod operation). In other words, an equation in Option 2 may be changed into RA-RNTI=1+(s_id+14×t_id+14×($80×2^{\mu-3}$)×f_id+14×($80×2^{\mu-3}$)×8×ul_carrier_id) mod $2^1$.

With regard to Option 2, it may be changed into RA-indication=floor{(1+s_id+14×t_id+14×($80×2^{\mu-3}$)×f_id+14×($80×2^{\mu-3}$)×8×ul_carrier_id)/($2^{15}$+1)} (adding +1 to a denominator).

Additionally or alternatively, with regard to Option 2, it may be changed into RA-indication=floor{(s_id+14×t_id+14×($80×2^{\mu-3}$)×f_id+14×($80×2^{\mu-3}$)×8×ul_carrier_id)/$2^5$} (removing +1 from a numerator).

Embodiment 2

This embodiment is about a method of changing a MSGB-RNTI equation according to the modification of a RA-RNTI equation.

When a RA-RNTI equation is defined by adding a modulo operation as in Embodiment 1 described above (e.g., changed Option 1 or changed Option 2 in Embodiment 1-2), a RA-RNTI value derived based thereon may partially overlap with a result value of an existing MSGB-RNTI equation. Accordingly, for a MSGB-RNTI and a RA-RNTI, a RA-RNTI/MSGB-RNTI equation may be configured/defined by considering at least one of the number of RNTIs required according to a size of SCS, distinction between a RA-RNTI and a MSGB-RNTI or distinction between a type 1 (or 4-step) RACH and a type 2 (or 2-step) RACH.

First, the number of RNTIs used/required according to a SCS size is as follows.

For SCS=120 kHz (or =3), 14*80*8*2=17920 RA-RNTIs (i.e., 1 to 17920 in decimal) may be used and 14*80*8*2=17920 MSGB-RNTIs (i.e., 17921 to 35840 in decimal) may be used.

For SCS=480 kHz (or =5), 14*80*22*8*2=71680 RA-RNTIs are required and 14*80*22*8*2=71680 MSGB-RN-TIs are required. For SCS=960 kHz (or =6), 14*80*23*8*2=143360 RA-RNTIs are required and 14*80*23*8*2=143360 MSGB-RNTIs are required.

For example, for a case of SCS=480 or 960 kHz, compared to a case of SCS=120 kHz, as the number of slots belonging to one frame/subframe increases, more PRACH transmissions may be allowed (i.e., more ROs may exist) in a time interval of a certain length. In other words, when the number of RO candidates which may be selected by a terminal increases, more RA-RNTIs/MSGB-RNTIs may be needed to support it. For example, when PRACH transmission is allowed in all slots, if SCS is doubled, the number of RO candidates may be also doubled. Although PRACH transmission is not allowed in all slots, the number of RA-RNTIs/MSGB-RNTIs required may increase when there are more ROs the number of ROs assumed by an existing RA-RNTI/MSGB-RNTI equation.

Next, a RA-RNTI and a MSGB-RNTI have a purpose of distinguishing an exact RNTI between actual terminals, but also have a purpose of distinguishing between RACH types (i.e., a 2-step RACH and a 4-step RACH), so a variety of methods for considering it to distinguish between a RA-RNTI and a MSB-RNTI may be defined. For example, based on one or a combination of a RNTI value or a DCI field value, a method of distinguishing between a RA-RNTI and a MSGB-RNTI or distinguishing between RACH type may be defined.

Scheme 1 corresponds to a method of defining/modifying a RA-RNTI/MSGB-RNTI equation to distinguish between a RA-RNTI and a MSGB-RNTI or distinguish between RACH types based on a RNTI value.

Scheme 2 corresponds to a method of defining/modifying a RA-RNTI/MSGB-RNTI equation to distinguish between a RA-RNTI and a MSGB-RNTI or distinguish between RACH types based on a combination of a RNTI value and a DCI field value.

Scheme 3 corresponds to a method of distinguishing between a RA-RNTI and a MSGB-RNTI or RACH types based on a value of a DCI field. In this case, a RA-RNTI/MSGB-RNTI equation may be or may not be modified (i.e., may be freely configured/defined).

Embodiment 2-1

As this embodiment is based on Scheme 1, specific offset value X between a MSGB-RNTI and a RA-RNTI (e.g., $X=2^{15}$) may be defined/applied to ensure that a RA-RNTI and a MSGB-RNTI are distinguished based on a RNTI value.

For example, based on Option 2, it may be defined as $RA\text{-}RNTI=1+(s\_id+14\times t\_id+14\times(80\times2^{\mu-3})\times f\_id+14\times(80\times2^{\mu-3})\times8\times ul\_carrier\_id)$ mod $2^{15}$ (Equation 1-A).

For example, based on Option 2, it may be defined as $MSGB\text{-}RNTI=1+(s\_id+14\times t\_id+14\times(80\times2^{\mu-3})\times f\_id+14\times(80\times2^{\mu-3})\times8\times ul\_carrier\_id)$ mod $2^{15}+2^{15}$ (Equation 1-B).

In addition, RA-indication may be defined to exclude a predefined/reserved RNTI value and/or configure/define a value greater than $2^{16}$ as being invalid.

For example, when a RNTI value predefined/reserved/exceeding $2^{16}$ is derived as a result value of the RA-RNTI/MSGB-RNTI equation, a terminal may be configured not to consider and use a corresponding value as being invalid. In this case, common to a RA-RNTI and a MSGB-RNTI, it may be defined as RA-indication=floor$\{(1+s\_id+14\times t\_id+14\times(80\times2^{\mu-3})\times f\_id+14\times(80\times2^{\mu-3})\times8\times ul\_carrier\_id)/(2^{15}+$ 1)$\}$ or may be defined as RA-indication=floor$\{(s\_id+14\times t\_id+14\times(80\times2^{\mu-3})\times f\_id+14\times(80\times2^{\mu-3})\times8\times ul\_carrier\_id)/2^{15}\}$.

Additionally or alternatively, for a divisor of a modulo operation and a denominator of a RA-indication-MSGB field for a MSGB-RNTI equation, a value of K and M that may avoid a predefined/reserved RNTI may be applied (e.g., $2^M$–K, M=16, 15, 14, . . . , K=13, 14, 15, . . . , etc.).

For example, for M=15, K=14, it may be defined as $MSGB\text{-}RNTI=1+(s\_id+14\times t\_id+14\times(80\times2^{\mu-3})\times f\_id+14\times(80\times2^{\mu-3})\times8\times ul\_carrier\_id)$ mod $(2^{15}-14)+2^{15}$.

In this case, it may be defined as RA-indication-MSGB=floor$\{(1+s\_id+14\times t\_id+14\times(80\times2^{\mu-3})\times f\_id+14\times(80\times2^{\mu-3})\times8\times ul\_carrier\_id)/(2^{15}-14+1)\}$ or may be defined as RA-indication-MSGB=floor$\{(s\_id+14\times t\_id+14\times(80\times2^{\mu-3})\times f\_id+14\times(80\times2^{\mu-3})\times8\times ul\_carrier\_id)/(2^5-14)\}$.

A reason why K=14 is configured in the examples is as follows. A RNTI is defined from 1 to 65535, and according to the Equation 1-A, 32768 RA-RNTIs may be used from 1 to 32768, and according to the Equation 1-B, only 32754 MSGB-RNTIs may be used from 32769 to 65522 (to avoid using a predefined/reserved RNTI value). Accordingly, for a divisor of a modulo operation and a denominator of a RA-indication-MSGB field for a MSGB-RNTI equation, $2^{15}-14=32754$ instead of $2^{15}$ may be applied to derive a MSGB-RNTI value in a unit of 32754.

For example, Table 7 and Table 8 show that for SCS=120 kHz, 17920 are required for each of a RA-RNTI and a MSGB-RNTI.

TABLE 7

| RA-RNTI | 1, . . . , 17920 |
|---|---|
| RA-indication | N/A |

TABLE 8

| MSGB-RNTI | 32769, . . . , 50688 |
|---|---|
| RA-indication(-MSGB) | N/A |

For example, Table 9 and Table 10 show that for SCS=480 kHz, 71680 are required for each of a RA-RNTI and a MSGB-RNTI.

TABLE 9

| RA-RNTI without mod | 1, . . . , 32768 | 32769, . . . , 65536 | 65537, . . . , 71680 |
|---|---|---|---|
| RA-RNTI | 1, . . . , 32768 | 1, . . . , 32768 | 1, . . . , 6144 |
| RA-indication | 0 | 1 | 2 |

TABLE 8

| MSGB-RNTI without mod | 32769, . . . , 65522 | 65523, . . . , 98276 | 98277, . . . , 104448 |
|---|---|---|---|
| MSGB-RNTI | 32769, . . . , 65522 | 32769, . . . , 65522 | 32769, . . . , 38940 |
| RA-indication(-MSGB) | 0 | 1 | 2 |

For example, Table 11 and Table 12 show that or SCS=960 kHz, 143360 are required or each of a RA-RNTI and a MSGB-RNTI.

TABLE 11

| RA-RNTI without mod | 1, . . . , 32768 | 32769, . . . , 65536 | 65537, . . . , 98304 | 98305, . . . , 131072 | 131073, . . . , 143360 |
|---|---|---|---|---|---|
| RA-RNTI | 1, . . . , 32768 | 1, . . . , 32768 | 1, . . . , 32768 | 1, . . . , 32768 | 1, . . . , 12288 |
| RA-indication | 0 | 1 | 2 | 3 | 4 |

TABLE 12

| MSGB-RNTI without mod | 32769, . . . , 65522 | 65523, . . . , 98276 | 98277, . . . , 131030 | 131031, . . . , 163784 | 163785, . . . , 176128 |
|---|---|---|---|---|---|
| MSGB-RNTI | 32769, . . . , 65522 | 32769, . . . , 65522 | 32769, . . . , 65522 | 32769, . . . , 65522 | 32769, . . . , 45112 |
| RA-indication(-MSGB) | 0 | 1 | 2 | 3 | 4 |

According to this embodiment, a RA-RNTI/a MSGB-RNTI or a RACH type (4-step/2-step) may be distinguished based only on a RNTI value. Accordingly, information for distinguishing between a RA-RNTI/a MSGB-RNTI or RACH types is not required within DCI. In addition, since a terminal may not be sure whether it is a RNTI value corresponding to a preamble transmitted by a terminal by using only a RNTI value derived based on a RA-RNTI/MSGB-RNTI equation, an accurate RNTI value may be determined based on an additional bit included in DCI (e.g., RA-indication or RA-indication-MSGB). For example, for an additional bit in DCI, 2 bits may be required for SCS=480 kHz and 3 bits may be required for SCS=960 kHz. A RA-indication (-MSGB) bit/field may be defined/added by utilizing a reserved bit/field of a DCI format (e.g., DCI format 1_0) that is CRC-scrambled with a RA-RNTI/a MSGB-RNTI.

Embodiment 2-1-1

Among equations of Embodiment 2-1, this embodiment corresponds to an example in which a value of $2^{14}$ is applied to offset value K for distinguishing between a RA-RNTI and a MSGB-RNTI, a divisor of a modulo operation of a RA-RNTI/MSGB-RNTI equation, a denominator of RA-indication, etc.

Accordingly, a RA-RNTI may be selected among values from 1 to 16384 and a MSGB-RNTI may be selected among values from 16385 to 32768. Accordingly, among RNTI candidate values, 32754 values from 32769 to 65522 may be used by a base station to configure another RNTI required for cell operation (e.g., a C-RNTI, etc.). In addition, since a RA-RNTI/MSGB-RNTI value according to this embodiment does not overlap with a predefined/reserved RNTI, exception processing is not required.

For example, it may be defined as RA-RNTI=1+(s_id+14×t_id+14×(80×2$^{\mu-3}$)×f_id+14×(80×2$^{\mu-3}$)×8×ul_carrier_id) mod $2^{14}$. With this regard, it may be defined as RA-indication=floor{(1+s_id+14×t_id+14×(80×2$^{\mu-3}$)×f_id+14×(80×2$^{\mu-3}$)×8×ul_carrier_id)/($2^{14}$+1)} or may be defined as RA-indication=floor{(s_id+14×t_id+14×(80×2$^{\mu-3}$)×f_id+14×(80×2$^{\mu-3}$)×8×ul_carrier_id)/$2^{14}$}.

For example, it may be defined as MSGB-RNTI=1+(s_id+14×t_id+14×(80×2$^{\mu-3}$)×f_id+14×(80×2$^{\mu-3}$)×8×ul_carrier_id) mod $2^{14}$+$2^{14}$. With this regard, it may be defined as RA-indication-MSGB=floor{(1+s_id+14×t_id+14×(80×

2$^{\mu-3}$)×f_id+14×(80×2$^{\mu-3}$)×8×ul_carrier_id)/($2^{14}$+1)} or may be defined as RA-indication-MSGB=floor{(s_id+14×t_id+14×(80×2$^{\mu-3}$)×f_id+14×(80×2$^{\mu-3}$)×8×ul_carrier_id)/$2^{14}$}.

According to this embodiment, since it is possible to distinguish between a RA-RNTI/a MSGB-RNTI or RACH types (4-step/2-step) based only on a RNTI value, information for distinguishing between a RA-RNTI/a MSGB-RNTI or RACH types is not required within DCI.

In addition, for an additional bit included in DCI to determine an accurate RNTI value (e.g., RA-indication or RA-indication-MSGB), 1 bit may be required for SCS=120 kHz, 3 bits may be required for SCS=480 kHz and 4 bits may be required for SCS=960 kHz. A RA-indication (-MSGB) bit/field may be defined/added by utilizing a reserved bit/field of a DCI format (e.g., DCI format 1_0) that is CRC-scrambled with a RA-RNTI/a MSGB-RNTI.

Embodiment 2-2

As this embodiment is based on Scheme 2, a specific offset value may be defined/applied to a modulo operation of a MSGB-RNTI equation compared to a modulo operation of a RA-RNTI equation so that a RA-RNTI/a MSGB-RNTI can be distinguished or RACH types (4-step/2-step) can be distinguished based on a RNTI value and a value of a DCI field. For example, a specific offset value may be the maximum value of a RA-RNTI. For example, a specific offset value may be 14×(80×2$^{\mu-3}$)×8×2. In this case, a range of a RA-RNTI candidate value and a range of a MSGB-RNTI candidate value may be continuous.

For example, based on Option 2, it may be defined as RA-RNTI=1+(s_id+14×t_id+14×(80×2$^{\mu-3}$)×f_id+14×(80×2$^{\mu-3}$)×8×ul_carrier_id) mod $2^{15}$ (same as Equation 2-A and Equation 1-A).

For example, it may be defined as MSGB-RNTI=1+(s_id+14×t_id+14×(80×2$^{\mu-3}$)×f_id+14×(80×2$^{\mu-3}$)×8×ul_carrier_id+14×(80×2$^{\mu-3}$)×8×2) mod $2^{15}$ (Equation 2-B).

For RA-indication and/or RA-indication-MSGB, examples of adding +1 to a denominator or removing +1 from a numerator may be applied.

For example, it may be defined as RA-indication=floor{(1+s_id+14×t_id+14×(80×2$^{\mu-3}$)×f_id+14×(80×2$^{\mu-3}$)×8×ul_carrier_id)/($2^{15}$+1)}. In addition, it may be defined as RA-indication-MSGB=floor{(1+s_id+14×t_id+14×(80×2$^{\mu-3}$)×f_id+14×(80×2$^{\mu-3}$)×8×ul_carrier_id+14×(80×2$^{\mu-3}$)×8×2)/($2^{15}$+1)}.

23

For example, it may be defined as RA-indication=floor$\{$(s_id+14×t_id+14×(80×2-3)×f_id+14×(80×$2^{\mu-3}$)×8×ul_carrier_id)/($2^{15}$)$\}$. In addition, it may be defined as RA-indication-MSGB=floor$\{$(s_id+14×t_id+14×(80×$2^{\mu-3}$)×f_id+14×(80×$2^{\mu-3}$)×8×ul_carrier_id+14×(80×$2^{\mu-3}$)×8×2)/($2^{15}$)$\}$.

For example, Table 13 and Table 14 show that for SCS=120 kHz, 17920 are required for each of a RA-RNTI and a MSGB-RNTI.

TABLE 13

| | |
|---|---|
| RA-RNTI without mod | 1, . . . , 17920 |
| RA-RNTI | 1, . . . , 17920 |
| RA-indication | 0 |

TABLE 14

| | | |
|---|---|---|
| MSGB-RNTI without mod | 17921, . . . , 32768 | 32769, . . . , 35840 |
| MSGB-RNTI | 17921, . . . , 32768 | 1, . . . , 3072 |
| RA-indication-MSGB | 0 | 1 |

For example, Table 15 and Table 16 show that for SCS=480 kHz, 71680 are required for each of a RA-RNTI and a MSGB-RNTI.

TABLE 15

| | | | |
|---|---|---|---|
| RA-RNTI without mod | 1, . . . , 32768 | 32769, . . . , 65536 | 65537, . . . , 71680 |
| RA-RNTI | 1, . . . , 32768 | 1, . . . , 32768 | 1, . . . , 6144 |
| RA-indication | 0 | 1 | 2 |

TABLE 16

| | | | |
|---|---|---|---|
| MSGB-RNTI without mod | 71681, . . . , 98304 | 98305, . . . , 131072 | 131073, . . . , 143360 |
| MSGB-RNTI | 6145, . . . , 32768 | 1, . . . , 32768 | 1, . . . , 12288 |
| RA-indication-MSGB | 2 | 3 | 4 |

For example, Table 17 and Table 18 show that for SCS=960 kHz, 143360 are required for each of a RA-RNTI and a MSGB-RNTI.

TABLE 17

| | | | | | |
|---|---|---|---|---|---|
| RA-RNTI without mod | 1, . . . , 32768 | 32769, . . . , 65536 | 65537, . . . , 98304 | 98305, . . . , 131072 | 131073, . . . , 143360 |
| RA-RNTI | 1, . . . , 32768 | 1, . . . , 32768 | 1, . . . , 32768 | 1, . . . , 32768 | 1, . . . , 12288 |
| RA-indication | 0 | 1 | 2 | 3 | 4 |

TABLE 18

| | | | | | |
|---|---|---|---|---|---|
| MSGB-RNTI without mod | 143361, . . . , 163840 | 163841, . . . , 196608 | 196609, . . . , 229376 | 229377, . . . , 262144 | 262145, . . . , 286720 |
| MSGB-RNTI | 12289, . . . , 32768 | 1, . . . , 32768 | 1, . . . , 32768 | 1, . . . , 32768 | 1, . . . , 24576 |
| RA-indication-MSGB | 4 | 5 | 6 | 7 | 8 |

24

According to this embodiment, it is impossible to distinguish between a RA-RNTI/a MSGB-RNTI or RACH types (4-step/2-step) based only on a RNTI value. Accordingly, when a terminal detects/reads DCI, a specific M-bit field in corresponding DCI may be checked to distinguish between a RA-RNTI/a MSGB-RNTI or RACH types (4-step/2-step). Accordingly, a terminal may check whether it is a RACH type intended by a corresponding terminal and an accurate RNTI value based on a RNTI value and a value of a M-bit field. For example, a size of a M-bit field (i.e., M) may be fixed to a predefined value (i.e., signaling between a base station and a terminal is not required for a value of M) by assuming that a base station may support/operate both a 2-step RACH and a 4-step RACH.

Alternatively, a size of a M-bit field (i.e., M) may be signaled by a base station as a cell-specific value (e.g., a value of M may be provided/configured for a terminal through a SIB, etc.). For example, a different value of M may be applied to a case in which a RACH type supported/operated by a base station is only a 4-step RACH and a case in which both a 2-step RACH and a 4-step RACH are supported. For example, a base station that supports/operates only a 4-step RACH may configure/indicate M' as a value of M and a base station that supports/operates both a 2-step RACH and a 4-step RACH may configure/indicate M" as a value of M. For example, M' may be less than or equal to M".

According to this embodiment, a RA-RNTI/a MSGB-RNTI may be selected in a range from 1 to 32768. Accordingly, among RNTI candidate values, 32754 values from 32769 to 65522 may be used by a base station to configure another RNTI required for cell operation (e.g., a C-RNTI, etc.). In addition, since a RA-RNTI/MSGB-RNTI value according to this embodiment does not overlap with a predefined/reserved RNTI, exception processing is not required.

According to this embodiment, unlike an existing method of distinguishing between a 2-step RACH and a 4-step RACH, a RA-RNTI/a MSGB-RNTI may be distinguished or RACH types (4-step/2-step) may be distinguished based on a M-bit field in DCI and a RNTI. In addition, a terminal that does not support a 2-step RACH may be also required to check an additional DCI field in DCI (e.g., a M-bit field).

For example, for a size of an additional DCI field (e.g., a M-bit field), 1 bit may be required for SCS=120 kHz, 3 bits may be required for SCS=480 kHz and 4 bits may be required for SCS=960 kHz. This additional field may be defined/added by utilizing a reserved bit/field of a DCI format (e.g., DCI format 10) that is CRC-scrambled with a RA-RNTI/a MSGB-RNTI.

Embodiment 2-2-1

Among equations of Embodiment 2-2, this embodiment corresponds to an example in which a value of $2^{16}$ is applied to a divisor of a modulo operation of a RA-RNTI/MSGB-RNTI equation, a denominator of RA-indication, etc.

For example, based on Option 2, it may be defined as RA-RNTI=1+(s_id+14×t_id+14×(80×2$^{\mu-3}$)×f_id+14×(80×2$^{\mu-3}$)×8×ul_carrier_id) mod $2^{16}$.

For example, it may be defined as MSGB-RNTI=1+(s_id+14×t_id+14×(80×2$^{\mu-3}$)×f_id+14×(80×2$^{\mu-3}$)×8×ul_carrier_id+14×(80×2$^{\mu-3}$)×8×2) mod $2^{16}$.

For RA-indication and/or RA-indication-MSGB, examples of adding +1 to a denominator or removing +1 from a numerator may be applied.

For example, it may be defined as RA-indication=floor{(1+s_id+14×t_id+14×(80×2$^{\mu-3}$)×f_id+14×(80×2$^{\mu-3}$)×8×ul_carrier_id)/($2^{16}$+1)}. In addition, it may be defined as RA-indication-MSGB=floor{(1+s_id+14×t_id+14×(80×2$^{\mu-3}$)×f_id+14×(80×2$^{\mu-3}$)×8×ul_carrier_id+14×(80×2$^{\mu-3}$)×8×2)/($2^{16}$+1)}.

For example, it may be defined as RA-indication=floor{(s_id+14×t_id+14×(80×2-3)×f_id+14×(80×2$^{\mu-3}$)×8×ul_carrier_id)/($2^{16}$)}. In addition, it may be defined as RA-indication-MSGB=floor{(s_id+14×t_id+14×(80×2$^{\mu-3}$)×f_id+14×(80×2$^{\mu-3}$)×8×ul_carrier_id+14×(80×2$^{\mu-3}$)×8×2)/($2^{16}$)}.

In addition, when a RNTI value predefined/reserved/exceeding $2^{16}$ is derived as a result value of the RA-RNTI/MSGB-RNTI equation, a terminal may be configured not to consider and use a corresponding value as being invalid.

Additionally or alternatively, in a RA-RNTI/MSGB-RNTI equation, another value, not $2^{16}$, (e.g., $2^{16}$−k, here, k is a proper integer (e.g., 14)) may be applied/defined to a divisor of a modulo operation, a denominator of RA-indication, etc. For example, a value of $2^{16}$−14 may be applied to a divisor of a modulo operation and a denominator of RA-indication in a RA-RNTI/MSGB-RNTI equation so that it is configured/defined to use only 65522 of 65535 RNTI candidate values excluding 13.

For example, based on Option 2, it may be defined as RA-RNTI=1+(s_id+14×t_id+14×(80×2$^{\mu-3}$)×f_id+14×(80×2$^{\mu-3}$)×8×ul_carrier_id) mod ($2^{16}$−14).

For example, it may be defined as MSGB-RNTI=1+(s_id+14×t_id+14×(80×2$^{\mu-3}$)×f_id+14×(80×2$^{\mu-3}$)×8×ul_carrier_id+14×(80×2$^{\mu-3}$)×8×2) mod ($2^{16}$−14).

For RA-indication and/or RA-indication-MSGB, examples of adding +1 to a denominator or removing +1 from a numerator may be applied.

For example, it may be defined as RA-indication=floor{(1+s_id+14×t_id+14×(80×2$^{\mu-3}$)×f_id+14×(80×2$^{\mu-3}$)×8×ul_carrier_id)/($2^{16}$−14+1)}. In addition, it may be defined as RA-indication-MSGB=floor{(1+s_id+14×t_id+14×(80×2$^{\mu-3}$)×f_id+14×(80×2$^{\mu-3}$)×8×ul_carrier_id+14×(80×2$^{\mu-3}$)×8×2)/($2^{16}$−14+1)}.

For example, it may be defined as RA-indication=floor{(s_id+14×t_id+14×(80×2-3)×f_id+14×(80×2$^{\mu-3}$)×8×ul_carrier_id)/($2^{16}$−14)}. In addition, it may be defined as RA-indication-MSGB=floor{(s_id+14×t_id+14×(80×2$^{\mu-3}$)×f_id+14×(80×2$^{\mu-3}$)×8×ul_carrier_id+14×(80×2$^{\mu-3}$)×8×2)/($2^{16}$ 14)}.

For example, Table 19 and Table 20 show that for SCS=120 kHz, 17920 are required for each of a RA-RNTI and a MSGB-RNTI.

TABLE 19

| RA-RNTI | 1, ... , 17920 |
|---|---|
| RA-indication | N/A |

TABLE 20

| MSGB-RNTI | 17921, ... , 35840 |
|---|---|
| RA-indication-MSGB | N/A |

For example, Table 21 and Table 22 show that for SCS=480 kHz, 71680 are required for each of a RA-RNTI and a MSGB-RNTI.

TABLE 21

| RA-RNTI without mod | 1, ... , 65522 | 65523, ... , 71680 |
|---|---|---|
| RA-RNTI | 1, ... , 65522 | 1, ... , 6158 |
| RA-indication | 0 | 1 |

TABLE 22

| MSGB-RNTI without mod | 71681, ... , 131044 | 131045, ... , 143360 |
|---|---|---|
| MSGB-RNTI | 6159, ... , 65522 | 1, ... , 12316 |
| RA-indication-MSGB | 1 | 2 |

For example, Table 23 and Table 24 show that for SCS=960 kHz, 143360 are required for each of a RA-RNTI and a MSGB-RNTI.

TABLE 23

| RA-RNTI without mod | 1, ... , 65522 | 65523, ... , 131044 | 131045, ... , 143360 |
|---|---|---|---|
| RA-RNTI | 1, ... , 65522 | 1, ... , 65522 | 1, ... , 12316 |
| RA-indication | 0 | 1 | 2 |

TABLE 24

| MSGB-RNTI without mod | 144361, ... , 196567 | 196568, ... , 262090 | 262091, ... , 286720 |
|---|---|---|---|
| MSGB-RNTI | 12317, ... , 65522 | 1, ... , 65522 | 1, ... , 24630 |
| RA-indication-MSGB | 2 | 3 | 4 |

According to this embodiment, it is impossible to distinguish between a RA-RNTI/a MSGB-RNTI or RACH types (4-step/2-step) based only on a RNTI value. Accordingly, when a terminal detects/reads DCI, a specific M-bit field in corresponding DCI may be checked to distinguish between a RA-RNTI/a MSGB-RNTI or RACH types (4-step/2-step). Accordingly, a terminal may check whether it is a RACH type intended by a corresponding terminal and an accurate RNTI value based on a RNTI value and a value of a M-bit field. For example, for a size of an additional DCI field (e.g., a M-bit field), 2 bits may be required for SCS=480 kHz and 3 bits may be required for SCS=960 kHz. This additional field may be defined/added by utilizing a reserved bit/field of a DCI format (e.g., DCI format 1_0) that is CRC-scrambled with a RA-RNTI/a MSGB-RNTI.

According to this embodiment, unlike an existing method of distinguishing between a 2-step RACH and a 4-step RACH, a RA-RNTI/a MSGB-RNTI may be distinguished or RACH types (4-step/2-step) may be distinguished based on a M-bit field in DCI and a RNTI. In addition, a terminal that does not support a 2-step RACH may be also required to check an additional DCI field in DCI (e.g., a M-bit field).

Embodiment 2-3

As this embodiment is based on Scheme 3, a RA-RNTI/a MSGB-RNTI may be distinguished or RACH types (4-step/2-step) may be distinguished based on a value of a DCI field and a RA-RNTI equation and/or a MSGB-RNTI equation may be configured/defined equally (or freely).

For example, a MSGB-RNTI equation may be defined to recycle (or equally configure/define) a RA-RNTI equation and introduce a separate 1-bit flag field in a DCI field to distinguish between a RA-RNTI/a MSGB-RNTI or distinguish between RACH types (4-step/2-step).

For example, 1 bit at a specific position (e.g., immediately before MSB, LSB, a RA-indication field or immediately after a RA-indication field, etc.) of DCI format 1_0 scrambled with a RA-RNTI/a MSGB-RNTI may be defined a RA type flag or a RA type indicator for distinction of a RA-RNTI/a MSGB-RNTI or distinction of RACH types (4-step/2-step).

A terminal may check a RA type indicator value at a corresponding specific position, check whether it is a RACH type intended by a terminal and proceed with a subsequent operation. Here, the 1-bit flag may be configured/defined to exist all the time (i.e., exist without separate signaling) by assuming that a base station supports/operates both a 2-step RACH and a 4-step RACH. Alternatively, the 1-bit flag may be configured to ensure that a base station signals its presence through a SIB, etc. For example, for a case in which a base station supports/operates only a 4-step RACH and a case in which a base station supports/operates both a 2-step RACH and a 4-step RACH, a base station may select whether the 1-bit flag will be used and accordingly, inform a terminal in advance of whether a corresponding flag exists. For example, when a base station supports/operates only a 4-step RACH, it may be configured/indicated to a terminal that there is no corresponding 1-bit flag and when a base station supports/operates both a 2-step RACH and a 4-step RACH, it may be configured/indicated to a terminal that there is a corresponding 1-bit flag.

For example, based on Option 2, it may be defined as RA-RNTI=1+(s_id+14×t_id+14×(80×2$^{\mu-3}$)×f_id+14×(80× 2$^{\mu-3}$)×8×ul_carrier_id) mod 2$^{15}$ (same as Equation 2-A and Equation 1-A). In addition, a MSGB-RNTI equation may be also defined in the same way as a RA-RNTI equation. In other words, a RA-RNTI equation and a MSGB-RNTI equation may be the same as the equation (i.e., a MSGB-RNTI equation reuses a RA-RNTI equation).

In addition, the same one equation may be applied without distinguishing between a RA-indication equation for a RA-RNTI and a RA-indication equation for a MSGB-RNTI. For a RA-indication equation, examples of adding +1 to a denominator or removing +1 from a numerator may be applied. For example, it may be defined as RA-indication=floor{(1+s_id+14×t_id+14×(80×2$^{\mu-3}$)×f_id+ 14×(80×2$^{\mu-3}$)×8×ul_carrier_id)/(2$^{15}$+1)}. Alternatively, it may be defined as RA-indication=floor{(s_id+14×t_id+14× (80×2$^{\mu-3}$)×f_id+14×(80×2$^{\mu-3}$)×8×ul_carrier_id)/(2$^{15}$)}.

For example, Table 25 and Table 26 show that for SCS=120 kHz, 17920 are required for each of a RA-RNTI and a MSGB-RNTI.

TABLE 25

| RA-RNTI without mod | 1, . . . , 17920 |
|---|---|
| RA-RNTI | 1, . . . , 17920 |
| RA type flag | 0 (4-step) |
| RA-indication | 0 |

TABLE 26

| MSGB-RNTI without mod | 1, . . . , 17920 |
|---|---|
| MSGB-RNTI | 1, . . . , 17920 |
| RA type flag | 1 (2-step) |
| RA-indication | 0 |

For example, Table 27 and Table 28 show that for SCS=480 kHz, 71680 are required for each of a RA-RNTI and a MSGB-RNTI.

TABLE 27

| RA-RNTI without mod | 1, . . . , 32768 | 32769, . . . , 65536 | 65537, . . . , 71680 |
|---|---|---|---|
| RA-RNTI | 1, . . . , 32768 | 1, . . . , 32768 | 1, . . . , 6144 |
| RA type flag | 0 (4-step) | | |
| RA-indication | 0 | 1 | 2 |

TABLE 28

| MSGB-RNTI without mod | 1, . . . , 32768 | 32769, . . . , 65536 | 65537, . . . , 71680 |
|---|---|---|---|
| MSGB-RNTI | 1, . . . , 32768 | 1, . . . , 32768 | 1, . . . , 6144 |
| RA type flag | 1 (2-step) | | |
| RA-indication | 0 | 1 | 2 |

For example, Table 29 and Table 30 show that for SCS=960 kHz, 143360 are required for each of a RA-RNTI and a MSGB-RNTI.

TABLE 29

| RA-RNTI without mod | 1, . . . , 32768 | 32769, . . . , 65536 | 65537, . . . , 98304 | 98305, . . . , 131072 | 131073, . . . , 143360 |
|---|---|---|---|---|---|
| RA-RNTI | 1, . . . , 32768 | 1, . . . , 32768 | 1, . . . , 32768 | 1, . . . , 32768 | 1, . . . , 12288 |
| RA type flag | 0 (4-step) | | | | |
| RA-indication | 0 | 1 | 2 | 3 | 4 |

TABLE 30

| MSGB-RNTI without mod | 1, . . . , 32768 | 32769, . . . , 65536 | 65537, . . . , 98304 | 98305, . . . , 131072 | 131073, . . . , 143360 |
|---|---|---|---|---|---|
| MSGB-RNTI | 1, . . . , 32768 | 1, . . . , 32768 | 1, . . . , 32768 | 1, . . . , 32768 | 1, . . . , 12288 |
| RA type flag | 1 (2-step) | | | | |
| RA-indication | 0 | 1 | 2 | 3 | 4 |

According to this embodiment, since a RNTI value is the same for a RA-RNTI and a MSGB-RNTI, it is possible to distinguish between a RA-RNTI/a MSGB-RNTI or RACH types (4-step/2-step) based only on a RNTI value. Accordingly, when a terminal detects/reads DCI, it may check a 1-bit flag in corresponding DCI (e.g., a RACH type indication field) to distinguish between a RA-RNTI/a MSGB-RNTI or distinguish between RACH types (4-step/2-step). Accordingly, based on a value of a 1-bit flag field in DCI, whether it is a RACH type intended by a corresponding terminal may be checked. Afterwards, a terminal may check an accurate RNTI value based on a RNTI value and a value of a RA-indication field. According to this embodiment, a RA-RNTI/a MSGB-RNTI may be selected in a range from 1 to 32768. Accordingly, among RNTI candidate values, 32754 values from 32769 to 65522 may be used by a base station to configure another RNTI required for cell operation (e.g., a C-RNTI, etc.). In addition, since a RA-RNTI/MSGB-RNTI value according to this embodiment does not overlap with a predefined/reserved RNTI, exception processing is not required.

According to this embodiment, unlike an existing method of distinguishing between a 2-step RACH and a 4-step RACH, a RA-RNTI/a MSGB-RNTI may be distinguished or RACH types (4-step/2-step) may be distinguished based on a 1-bit flag field in DCI.

For example, for a size of an additional DCI field (e.g., a sum of a RA-indication field and a RA type indication field), 1 bit may be required for SCS=120 kHz, 3 bits may be required for SCS=480 kHz and 4 bits may be required for SCS=960 kHz. This additional field may be defined/added by utilizing a reserved bit/field of a DCI format (e.g., DCI format 10) that is CRC-scrambled with a RA-RNTI/a MSGB-RNTI.

Embodiment 2-3-1

Among equations of Embodiment 2-3, this embodiment corresponds to an example in which a value of $2^{16}$ is applied to a divisor of a modulo operation of a RA-RNTI equation (the same as a MSGB-RNTI equation), a denominator of RA-indication, etc.

For example, based on Option 2, it may be defined as RA-RNTI=1+(s_id+14×t_id+14×(80×2$^{\mu-3}$)×f_id+14×(80× 2$^{\mu-3}$)×8×ul_carrier_id) mod $2^{16}$. In addition, a MSGB-RNTI equation may be also defined in the same way as a RA-RNTI equation. In other words, a RA-RNTI equation and a MSGB-RNTI equation may be the same as the equation (i.e., a MSGB-RNTI equation reuses a RA-RNTI equation).

In addition, the same one equation may be applied without distinguishing between a RA-indication equation for a RA-RNTI and a RA-indication equation for a MSGB-RNTI. For a RA-indication equation, examples of adding +1 to a denominator or removing +1 from a numerator may be applied. For example, it may be defined as RA-indication=floor{(1+s_id+14×t_id+14×(80×2$^{\mu-3}$)×f_id+ 14×(80×2$^{\mu-3}$)×8×ul_carrier_id)/($2^{16}$+1)}. Alternatively, it may be defined as RA-indication=floor{(s_id+14×t_id+14× (80×2$^{\mu-3}$)×f_id+14×(80×2$^{\mu-3}$)×8×ul_carrier_id)/($2^{16}$)}.

In addition, when a RNTI value predefined/reserved/ exceeding 216 is derived as a result value of the RA-RNTI/

MSGB-RNTI equation, a terminal may be configured not to consider and use a corresponding value as being invalid.

Additionally or alternatively, in a RA-RNTI/MSGB-RNTI equation, another value, not $2^{16}$, (e.g., $2^{16}$−k, here, k is a proper integer (e.g., 14)) may be applied/defined to a divisor of a modulo operation, a denominator of RA-indication, etc. For example, a value of $2^{16}$−14 may be applied to a divisor of a modulo operation and a denominator of RA-indication in a RA-RNTI/MSGB-RNTI equation so that it is configured/defined to use only 65522 of 65535 RNTI candidate values excluding 13.

For example, based on Option 2, it may be defined as RA-RNTI=1+(s_id+14×t_id+14×(80×2$^{\mu-3}$)×f_id+14×(80× 2$^{\mu-3}$)×8×ul_carrier_id) mod ($2^{16}$−14). In addition, a MSGB-RNTI equation may be also defined in the same way as a RA-RNTI equation.

In addition, the same one equation may be applied without distinguishing between a RA-indication equation for a RA-RNTI and a RA-indication equation for a MSGB-RNTI. For a RA-indication equation, examples of adding +1 to a denominator or removing +1 from a numerator may be applied. For example, it may be defined as RA-indication=floor{(1+s_id+14×t_id+14×(80×2$^{\mu-3}$)×f_id+ 14×(80×2$^{\mu-3}$)×8×ul_carrier_id)/($2^{16}$−14+1)}. Alternatively, it may be defined as RA-indication=floor{(s_id+14×t_id+ 14×(80×2$^{\mu-3}$)×f_id+14×(80×2$^{\mu-3}$)×8×ul_carrier_id)/($2^{16}$− 14)}.

For example, Table 31 and Table 32 show that for SCS=120 kHz, 17920 are required for each of a RA-RNTI and a MSGB-RNTI.

TABLE 31

| RA-RNTI without mod | 1, . . . , 17920 |
|---|---|
| RA-RNTI | 1, . . . , 17920 |
| RA type flag | 0 (4-step) |
| RA-indication | 0 |

TABLE 32

| MSGB-RNTI without mod | 1, . . . , 17920 |
|---|---|
| MSGB-RNTI | 1, . . . , 17920 |
| RA type flag | 1 (2-step) |
| RA-indication | 0 |

For example, Table 33 and Table 34 show that for SCS=480 kHz, 71680 are required for each of a RA-RNTI and a MSGB-RNTI.

TABLE 33

| RA-RNTI without mod | 1, . . . , 65522 | 65523, . . . , 71680 |
|---|---|---|
| RA-RNTI | 1, . . . , 65522 | 1, . . . , 6158 |
| RA type flag | 0 (4-step) | |
| RA-indication | 0 | 1 |

TABLE 34

| MSGB-RNTI without mod | 1, . . . , 65522 | 65523, . . . , 71680 |
|---|---|---|
| MSGB-RNTI | 1, . . . , 65522 | 1, . . . , 6158 |
| RA type flag | 1 (2-step) | |
| RA-indication | 0 | 1 |

For example, Table 35 and Table 36 show that for SCS=960 kHz, 143360 are required for each of a RA-RNTI and a MSGB-RNTI.

TABLE 35

| RA-RNTI without mod | 1, . . . , 65522 | 65523, . . . , 131044 | 131045, . . . , 143360 |
|---|---|---|---|
| RA-RNTI | 1, . . . , 65522 | 1, . . . , 65522 | 1, . . . , 12316 |
| RA type flag | 0 (4-step) | | |
| RA-indication | 0 | 1 | 2 |

TABLE 36

| MSGB- RNTI without mod | 1, . . . , 65522 | 65523, . . . , 131044 | 131045, . . . , 143360 |
|---|---|---|---|
| MSGB-RNTI | 1, . . . , 65522 | 1, . . . , 65522 | 1, . . . , 12316 |
| RA type flag | 1 (2-step) | | |
| RA-indication | 0 | 1 | 2 |

According to this embodiment, it is impossible to distinguish between a RA-RNTI/a MSGB-RNTI or RACH types (4-step/2-step) based only on a RNTI value. Accordingly, when a terminal detects/reads DCI, it may check a 1-bit flag in corresponding DCI (e.g., a RACH type indication field) to distinguish between a RA-RNTI/a MSGB-RNTI or distinguish between RACH types (4-step/2-step). Accordingly, based on a value of a 1-bit flag field in DCI, whether it is a RACH type intended by a corresponding terminal may be checked. Afterwards, a terminal may check an accurate RNTI value based on a RNTI value and a value of a RA-indication field. Since this embodiment may directly indicate a RA type compared to Embodiment 2-2 or Embodiment 2-2-1, complexity of a terminal operation may be reduced.

For a size of an additional DCI field (e.g., a sum of a RA-indication field and a RA type indication field) in this embodiment, 1 bit may be required for SCS=120 kHz, 2 bits may be required for SCS=480 kHz and 3 bits may be required for SCS=960 kHz. This additional field may be defined/added by utilizing a reserved bit/field of a DCI format (e.g., DCI format 10) that is CRC-scrambled with a RA-RNTI/a MSGB-RNTI.

According to this embodiment, unlike an existing method of distinguishing between a 2-step RACH and a 4-step RACH, a RA-RNTI/a MSGB-RNTI may be distinguished or RACH types (4-step/2-step) may be distinguished based on a 1-bit flag field in DCI.

In various examples of the present disclosure described above, a RA-RNTI and/or a MSGB-RNTI for SCS less than or equal to 120 kHz was already defined, so a modified RA-RNTI equation and/or a modified MSGB-RNTI equation according to examples of the present disclosure may be configured not to be applied to SCS=120 kHz (i.e., an existing RA-RNTI/MSGB-RNTI equation is not modified). Accordingly, only for SCS exceeding 120 (e.g., 480 kHz and/or 960 kHz) or SCS equal to or greater than it, the above-described modified RA-RNTI equation, modified MSGB-RNTI and/or additional DCI field (e.g., a RA-indication field, a M-bit field, a 1-bit flag field, etc.) may be applied/defined.

Examples of the present disclosure may be applied to SCS exceeding a predetermined threshold and may be also applied to a case in which for SCS exceeding a predetermined threshold, all time units (e.g., a slot) are used for RA preamble (or PRACH) transmission. In addition, examples of the present disclosure may be applied to support a wireless communication system in a new frequency band other than FR1/FR2.

Figure 11:
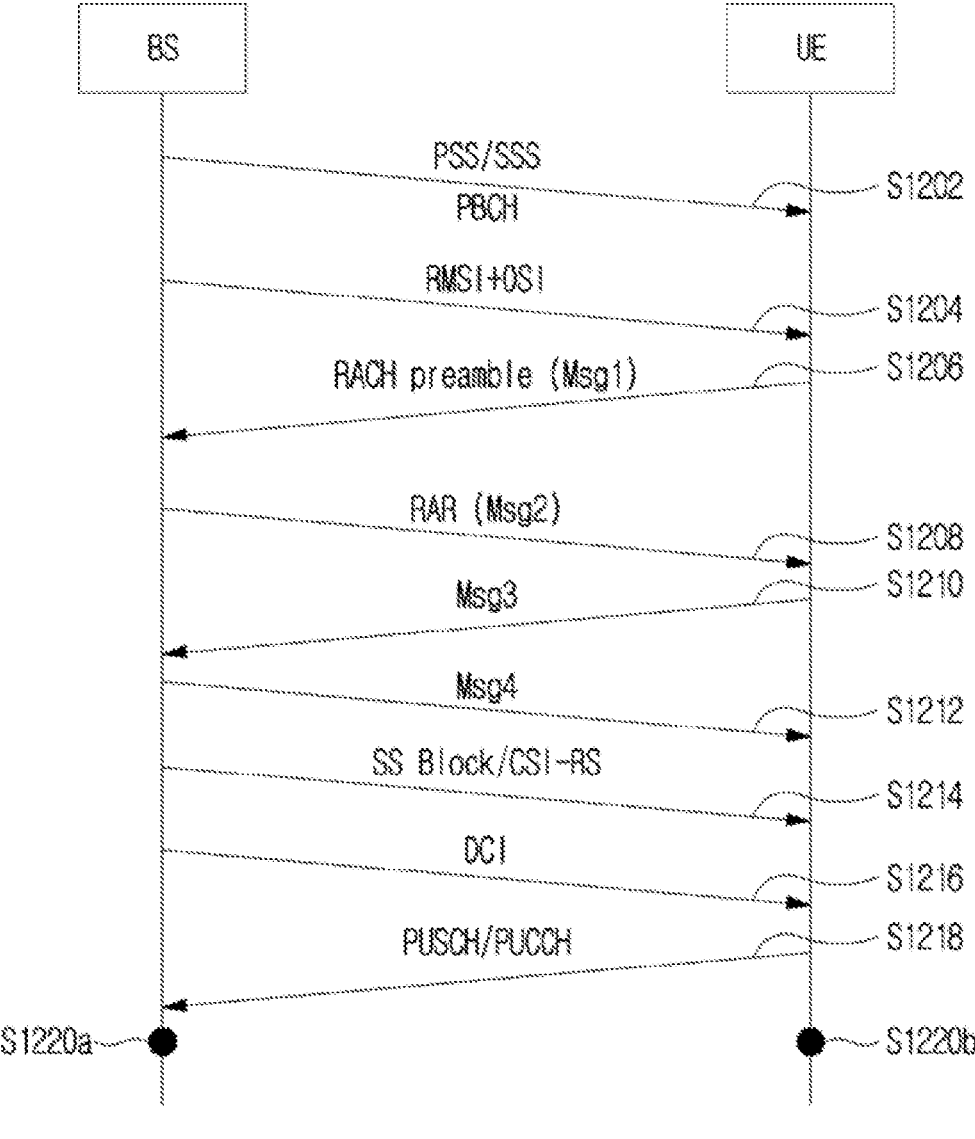
FIG. 11 is a diagram for describing a signaling process between a terminal and a base station according to an embodiment of the present disclosure.

FIG. 11 is a diagram illustrating a signaling method between a terminal and a base station according to an embodiment of the present disclosure.

FIG. 11 shows an example of signaling between a base station (BS) (or a network) and a terminal (UE) to which embodiments proposed in the present disclosure (the above-described embodiments 1, 2, 3 or at least one of detailed embodiments thereof) may be applied. Here, a terminal/a base station is just an example and may be implemented with various devices.

In addition, FIG. 11 illustrates a signaling flowchart for convenience of a description of the present disclosure and does not limit a scope of the present disclosure. In addition, some of step(s) illustrated in FIG. 11 may be omitted according to a situation and/or a configuration, etc. And, each step described by referring to FIG. 11 may be implemented by a device of FIG. 12 which will be described below.

In the following description, a base station may be one base station including a plurality of TRPs or may be one cell including a plurality of TRPs. As an example, an ideal/non-ideal backhaul may be configured between TRP 1 and TRP 2 configuring one base station. In addition, the following description is described based on multiple TRPs, but it may be also equally extended and applied to transmission through multiple panels/cells.

In addition, as described above, "TRP" may be applied by being replaced with an expression such as a panel, an antenna array, a cell (e.g., a macro cell/a small cell/a pico cell, etc.), a transmission point (TP), a base station (gNB, etc.), etc. As described above, a TRP may be divided according to information (e.g., an index, an ID) on a CORESET group (or a CORESET pool). As an example, when one terminal is configured to perform transmission or reception with multiple TRPs (or cells), it may mean that multiple CORESET groups (or CORESET pools) are configured for one terminal. Such a configuration for a CORESET group (or a CORESET pool) may be performed through higher layer signaling (e.g., RRC signaling, etc.). In addition, a base station may refer to a general term for an object that transmits or receives data with a terminal. For example, the base station may be a concept that includes at least one transmission points (TP), at least one transmission and reception points (TRP), etc. In addition, a TP and/or a TRP may include a panel of a base station, a transmission and reception unit, etc.

In reference to FIG. 11, a base station (e.g., BS) may periodically transmit a SSB to a terminal S1202. Here, a SSB may include a PSS/a SSS/a PBCH. A base station may transmit a SSB to a terminal by using beam sweeping.

A base station may transmit remaining minimum system information (RMSI) and other system information (OSI) to a terminal S1204. RMSI may include information (e.g., PRACH configuration information) required for a terminal to initially access a base station. In this case, a terminal may identify the best SSB after performing SSB detection.

Afterwards, a terminal may use a PRACH resource linked/corresponding to an index (i.e., a beam) of the best SSB to transmit a RACH preamble (Message 1, Msg1) to a base station S1206. A beam direction of a RACH preamble may be associated with a PRACH resource. An association between a PRACH resource (and/or a RACH preamble) and a SSB index may be configured through system information (e.g., RMSI).

Afterwards, as part of a RACH process, a base station may transmit a Random Access Response (RAR) (Msg2) to a terminal in response to a RACH preamble S1208. A terminal may transmit Msg3 (e.g., a RRC Connection Request) by using uplink grant within a RAR S1210. A base station may transmit a contention resolution message (Msg4) to a terminal S1212. Msg4 may include RRC Connection Setup.

For example, UE may calculate a RA-RNTI and/or a MSGB-RNTI based on a RA preamble, etc. according to examples of the present disclosure described above (e.g., Embodiments 1, 2, 3 or at least one of detailed embodiments thereof). In addition, based on a calculated RA-RNTI/MSGB-RNTI, DCI/PDCCH scheduling a PDSCH including a RAR may be monitored/detected. In addition, UE may distinguish between a RA-RNTI or a MSGB-RNTI or distinguish between RACH types (e.g., a 2-step RACH or a 4-step RACH) based on an additional field in detected DCI. Accordingly, UE may efficiently transmit a random access preamble in SCS exceeding a predetermined SCS value (e.g., 480 kHz, 960 kHz, etc.) and receive a random access response thereto.

When a RRC connection between a base station and a terminal is configured through a RACH process, subsequent beam arrangement may be performed based on a SSB/a CSI-RS (in a downlink) and a SRS (in an uplink). For example, a terminal may receive a SSB/a CSI-RS S1214. A SSB/a CSI-RS may be used by a terminal to generate beam/CSI reporting.

In addition, a base station may request beam/CSI reporting to a terminal through DCI S1216. In this case, a terminal may generate beam/CSI reporting based on a SSB/a CSI-RS and transmit generated beam/CSI reporting to a base station through a PUSCH/a PUCCH S1218. Beam/CSI reporting may include information on a preferred beam, etc. from a beam measurement result. A base station and a terminal may switch a beam based on beam/CSI reporting S1220a, S1220b.

Afterwards, a terminal and a base station may perform embodiments described/proposed above. For example, a terminal and a base station may transmit a wireless signal by processing information in a memory according to an embodiment of the present disclosure or process a received wireless signal and store it in a memory based on configuration information obtained from a network access procedure (e.g., a system information acquisition procedure, a RRC connection procedure through a RACH, etc.). Here, a wireless signal may include at least one of a PDCCH, a PDSCH and a Reference Signal (RS) in case of a downlink and may include at least one of a PUCCH, a PUSCH and a SRS in case of an uplink.

General Device to which the Present Disclosure May be Applied

Figure 12:
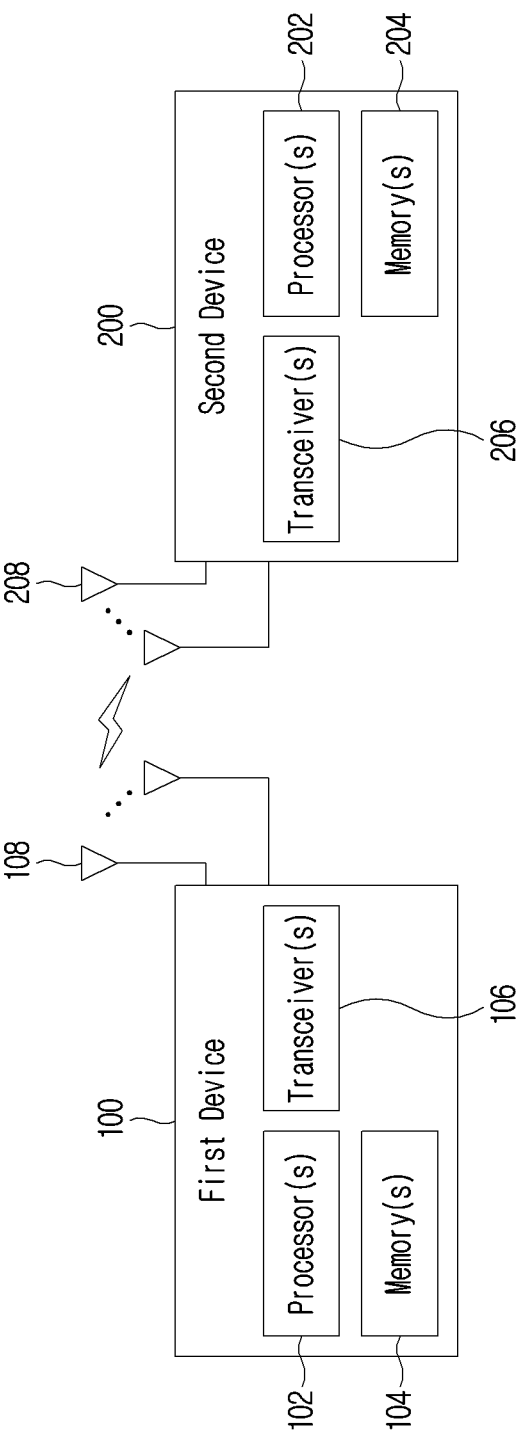
FIG. 12 is a diagram which illustrates a block diagram of a wireless communication device according to an embodiment of the present disclosure.

FIG. 12 illustrates a block diagram of a wireless communication device according to an embodiment of the present disclosure.

In reference to FIG. 12, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method performed by a terminal in a wireless communication system, the method comprising:

transmitting a random access preamble to a network in a slot based on a subcarrier spacing (SCS) exceeding a predetermined threshold;

monitoring a downlink control information (DCI) based on a specific radio network temporary identifier (RNTI) corresponding to the random access preamble; and receiving a downlink data channel from the network based on scheduling information included in the DCI, wherein the specific RNTI is determined based on a value derived by a modulo operation using $2^M$–K as a divisor, M is associated with an offset value for distinguishing a type of a random access procedure, and K is an integer exceeding 12.

2. The method according to claim 1, wherein:

a candidate value of the specific RNTI based on the K does not overlap with a candidate value of another RNTI.

3. The method according to claim 2, wherein:

the candidate value of the another RNTI includes a value defined as a paging (P)-RNTI, a system information (SI)-RNTI, and a reserved RNTI.

4. The method according to claim 1, wherein:

the specific RNTI is a random access (RA)-RNTI related to a type-1 random access procedure or a message B (MSGB)-RNTI related to a type-2 random access procedure.

5. The method according to claim 4, wherein:

a range of a candidate value of the RA-RNTI does not overlap with a range of a candidate value of the MSGB-RNTI.

6. The method according to claim 1, wherein:

the DCI includes a random access indication field, the specific RNTI is determined based on the value derived by the modulo operation and a value of the random access indication field.

7. The method according to claim 6, wherein:

the value of the random access indication field is determined based on a floor operation using $2^M$–K as a denominator.

8. The method according to claim 1, wherein:

the predetermined threshold is 120 kHz.

9. The method according to claim 1, wherein:

the M is one of 16, 15 or 14.

10. The method according to claim 1, wherein:

the K is 14.

11. A terminal in a wireless communication system, the terminal comprising:

at least one transceiver; and at least one processor connected to the at least one transceiver, wherein the at least one processor is configured to:

transmit, through the at least one transceiver, a random access preamble to a network in a slot based on a subcarrier spacing (SCS) exceeding a predetermined threshold;

monitor a downlink control information (DCI) based on a specific radio network temporary identifier (RNTI) corresponding to the random access preamble; and receive, through the at least one transceiver, a downlink data channel from the network based on scheduling information included in the DCI, wherein the specific RNTI is determined based on a value derived by a modulo operation using $2^M$–K as a divisor, M is associated with an offset value for distinguishing a type of a random access procedure, and K is an integer exceeding 12.

12. A base station for responding to a random access procedure of a terminal in a wireless communication system, the base station comprising:

at least one transceiver; and at least one processor connected to the at least one transceiver, wherein the at least one processor is configured to:

receive, through the at least one transceiver, a random access preamble from a terminal in a slot based on a subcarrier spacing (SCS) exceeding a predetermined threshold; and transmit, through the at least one transceiver, to the terminal, a downlink control information (DCI) based on a specific radio network temporary identifier (RNTI) corresponding to the random access preamble and a downlink data channel based on scheduling information included in the DCI, wherein the specific RNTI is determined based on a value derived by a modulo operation using $2^M - K$ as a divisor, M is associated with an offset value for distinguishing a type of a random access procedure, and K is an integer exceeding 12.

* * * * *